(12) United States Patent
Lara Rodriguez et al.

(10) Patent No.: US 11,505,730 B2
(45) Date of Patent: Nov. 22, 2022

(54) TETRAHEDRAL ABRASIVE PARTICLES IN ABRASIVE ARTICLES

(71) Applicant: 3M INNOVATIVE PROPERTIES COMPANY, St. Paul, MN (US)

(72) Inventors: Laura M. Lara Rodriguez, Woodbury, MN (US); Chainika Jangu, Woodbury, MN (US); Scott R. Culler, Burnsville, MN (US); Negus B. Adefris, St. Paul, MN (US); Gregory S. Mueller, Eden Prairie, MN (US); Jon T. Schwartz, St. Paul, MN (US); Brian G. Koethe, Cottage Grove, MN (US); Robinette S. Alkhas, St. Paul, MN (US); Ronald D. Apple, Apple Valley, CA (US); Ernest L. Thurber, Somerset, WI (US)

(73) Assignee: 3M Innovative Properties Company, St. Paul, MN (US)

(*) Notice: Subject to any disclaimer, the term of this patent is extended or adjusted under 35 U.S.C. 154(b) by 92 days.

(21) Appl. No.: 16/612,507

(22) PCT Filed: May 11, 2018

(86) PCT No.: PCT/IB2018/053300
§ 371 (c)(1),
(2) Date: Nov. 11, 2019

(87) PCT Pub. No.: WO2018/207145
PCT Pub. Date: Nov. 15, 2018

(65) Prior Publication Data
US 2020/0199425 A1 Jun. 25, 2020

Related U.S. Application Data

(60) Provisional application No. 62/505,280, filed on May 12, 2017.

(51) Int. Cl.
C09K 3/14 (2006.01)
B24D 3/00 (2006.01)
(Continued)

(52) U.S. Cl.
CPC ............ *C09K 3/1418* (2013.01); *B24D 3/00* (2013.01); *B24D 13/04* (2013.01); *B24D 18/0072* (2013.01); *C01F 7/441* (2013.01)

(58) Field of Classification Search
CPC ...... B24D 3/00; B24D 13/04; B24D 18/0072; C09K 3/1418
See application file for complete search history.

(56) References Cited

U.S. PATENT DOCUMENTS

| | | |
|---|---|---|
| 2,958,593 A | 11/1960 | Hoover |
| 4,744,802 A | 5/1988 | Schwabel |

(Continued)

FOREIGN PATENT DOCUMENTS

| | | |
|---|---|---|
| CN | 2778476 Y | 5/2006 |
| CN | 202985381 | 6/2013 |

(Continued)

OTHER PUBLICATIONS

International Search Report for PCT International Application No. PCT/IB2018/053300, dated Sep. 9, 2018, 6 pages.

*Primary Examiner* — Pegah Parvini
(74) *Attorney, Agent, or Firm* — Katherine M. Scholz

(57) ABSTRACT

Various embodiments disclosed relate to an abrasive article (10). The abrasive article (10 includes a backing (12) defining a major surface. The abrasive article (10) includes an abrasive layer including a plurality of tetrahedral abrasive particles (16) attached to the backing (12). The tetrahedral abrasive particles (16) include four faces joined by six edges terminating at four vertices (40, 42, 44, 46). Each one of the four faces contacts three of the four faces, and a major (Continued)

portion of the tetrahedral abrasive particles (16) have at least one of the vertices (40, 42, 44, 46) oriented in substantially a same direction.

19 Claims, 8 Drawing Sheets

(51) Int. Cl.
*B24D 13/04* (2006.01)
*B24D 18/00* (2006.01)
*C01F 7/441* (2022.01)

(56) References Cited

U.S. PATENT DOCUMENTS

| | | |
|---|---|---|
| 5,164,348 A | 11/1992 | Wood |
| 5,453,106 A | 9/1995 | Roberts |
| 5,498,269 A | 3/1996 | Larmie |
| 5,554,068 A | 9/1996 | Carr |
| 5,725,617 A * | 3/1998 | Hagiwara ................ B24D 3/34 51/295 |
| 5,893,935 A | 4/1999 | Wood |
| 5,996,167 A * | 12/1999 | Close ...................... B24D 3/28 15/230.12 |
| 6,039,775 A | 3/2000 | Ho |
| 9,079,294 B2 | 7/2015 | Holmes |
| 9,573,250 B2 | 2/2017 | Schwabel |
| 2008/0127572 A1 | 6/2008 | Ludwig |
| 2009/0165394 A1 | 7/2009 | Culler |
| 2009/0215366 A1 | 8/2009 | Ishizuka |
| 2013/0040537 A1* | 2/2013 | Schwabel ................ B24D 7/04 451/28 |
| 2014/0106126 A1 | 4/2014 | Gaeta |
| 2014/0186585 A1 | 7/2014 | Field, III |
| 2015/0267097 A1 | 9/2015 | Rosenflanz |
| 2016/0068729 A1 | 3/2016 | Erickson |
| 2016/0144480 A1 | 5/2016 | Eugster |
| 2017/0129075 A1* | 5/2017 | Thurber ................ B24D 3/002 |
| 2020/0086458 A1* | 3/2020 | Castillo .............. B24D 18/0009 |

FOREIGN PATENT DOCUMENTS

| | | |
|---|---|---|
| WO | 2010011801 A2 | 1/2010 |
| WO | WO 2011-139562 | 11/2011 |
| WO | 2012092618 A2 | 7/2012 |
| WO | WO 2014-206967 | 12/2014 |
| WO | WO 2016-167967 | 10/2016 |
| WO | WO 2018-063902 | 4/2018 |

* cited by examiner

— 100μm

— 100μm

TETRAHEDRAL ABRASIVE PARTICLES IN ABRASIVE ARTICLES

CROSS REFERENCE TO RELATED APPLICATIONS

This application is a national stage filing under 35 U.S.C. 371 of PCT/IB2018/053300 filed May 11, 2018, which claims the benefit of U.S. Provisional Application No. 62/505,280, filed May 12, 2017, the disclosure of which is incorporated by reference in its entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of abrasive particles or abrasive articles.

SUMMARY OF THE DISCLOSURE

The present disclosure provides an abrasive article. The abrasive article includes a backing defining a major surface. The abrasive article includes an abrasive layer including a plurality of tetrahedral abrasive particles attached to the backing. The tetrahedral abrasive particles include four faces joined by six edges terminating at four vertices. Each one of the four faces contacts three of the four faces, and a major portion of the tetrahedral abrasive particles have at least one of the vertices oriented in substantially the same direction.

The present disclosure further provides an abrasive article. The abrasive article includes a backing defining a major surface. The abrasive article includes an abrasive layer including a plurality of tetrahedral abrasive particles attached to the backing by a binder including a resinous adhesive. The tetrahedral abrasive particles have four faces joined by six edges terminating at four vertices. Each one of the four faces contacts three of the four faces, and about 90% to about 100% of the tetrahedral abrasive particles have a vertex oriented away from the backing in a direction substantially perpendicular to the major surface.

The present disclosure further provides a method of forming an abrasive article. The abrasive article includes a backing defining a major surface. The abrasive article includes an abrasive layer including a plurality of tetrahedral abrasive particles attached to the backing. The tetrahedral abrasive particles include four faces joined by six edges terminating at four vertices. Each one of the four faces contacts three of the four faces, and a major portion of the tetrahedral abrasive particles have at least one of the vertices oriented in substantially the same direction. The abrasive article is formed by depositing the plurality of tetrahedral abrasive particles on the backing. The plurality of tetrahedral abrasive particles adhere to the backing to form the abrasive article.

The present disclosure further provides a method of abrading a workpiece. The method includes frictionally contacting at least a portion of the abrasive article with a surface of the workpiece. The abrasive article includes a backing defining a surface along a major surface. The abrasive article includes an abrasive layer including a plurality of tetrahedral abrasive particles attached to the backing. The tetrahedral abrasive particles include four faces joined by six edges terminating at four vertices. Each one of the four faces contacts three of the four faces, and a major portion of the tetrahedral abrasive particles have at least one of the vertices oriented in substantially the same direction. Once the abrasive article is in contact with the surface of the workpiece, at least one of the workpiece or the abrasive article is moved with respect to the other, causing the abrasive article to abrade at least a portion of the surface of the workpiece.

According to some examples of the present disclosure, there are various advantages associated with the coated abrasive articles, some of which are unexpected. For example, according to some examples, a majority of the tetrahedral abrasive particles of the coated abrasive article can have one vertex oriented away from the backing. This can allow for a high number of vertices to be available to contact a surface of an article to be abraded. Having a higher number of vertices in contact with the surface can help to increase the cut of the coated abrasive article. According to some examples, the finish or surface roughness of the article can be controlled, which can increase the performance of the article and increase the visual appeal of the article. According to some examples, the tetrahedral abrasive particles have a high degree of symmetry, which can help to lead to a majority of the tetrahedral abrasive particles of the coated abrasive article having one vertex oriented away from the backing. According to some examples, the tetrahedral abrasive particles can be rotated about a z-direction relative to the x-y direction of the backing. This can allow for tighter packing of adjacent tetrahedral abrasive particles or can allow for the formation of specific patterns to increase the cut of the abrasive particles. Additionally, according to some examples, controlling the orientation of the vertices or the rotation of the abrasive particles can help to form channels between adjacent abrasive particles which can help to clear swarf from a workpiece and from the abrasive article. Additionally, according to some examples, the coated abrasive articles can be formed in part through either drop-coating or electrostatically coating the abrasive particles. According to some examples, either coating method can result in the majority of the tetrahedral abrasive particles of the coated abrasive article having one vertex oriented away from the backing.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Figure 1A:
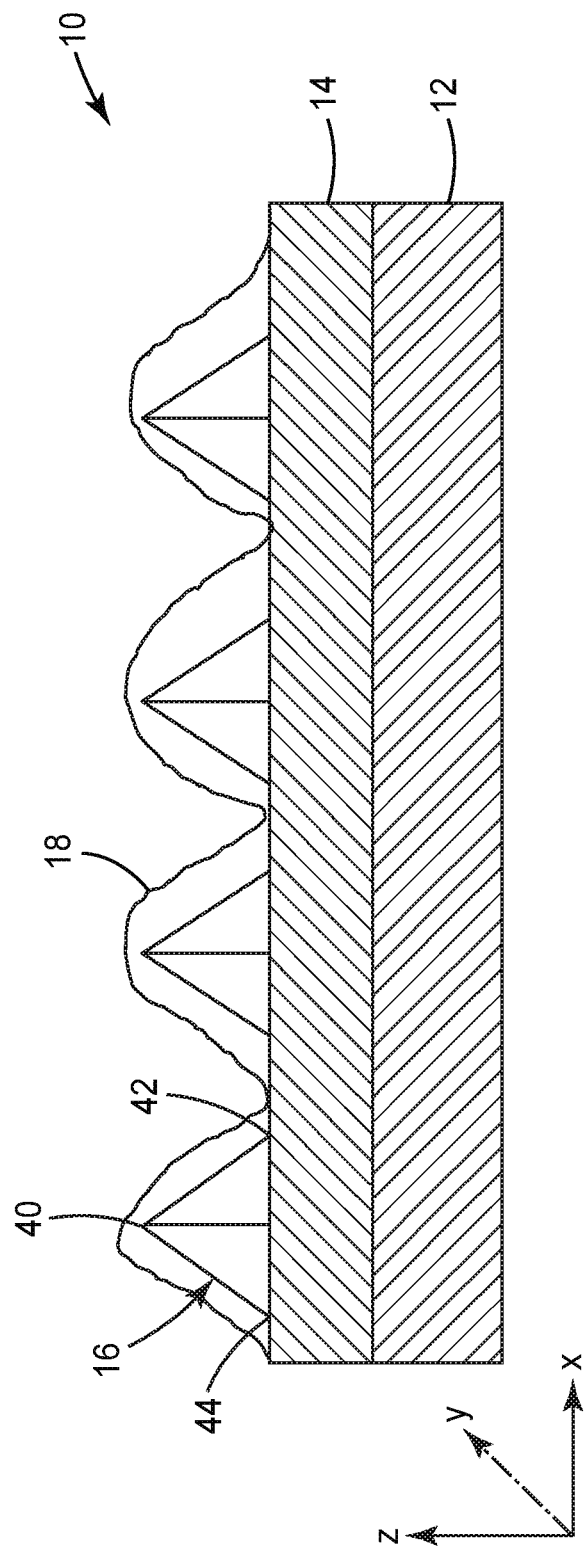
FIG. 1A is a sectional view of a coated abrasive article including tetrahedral abrasive particles having a vertex oriented away from a backing of the coated abrasive article in a direction substantially perpendicular to a major surface of the backing, in accordance with various embodiments.
Figure 1B:
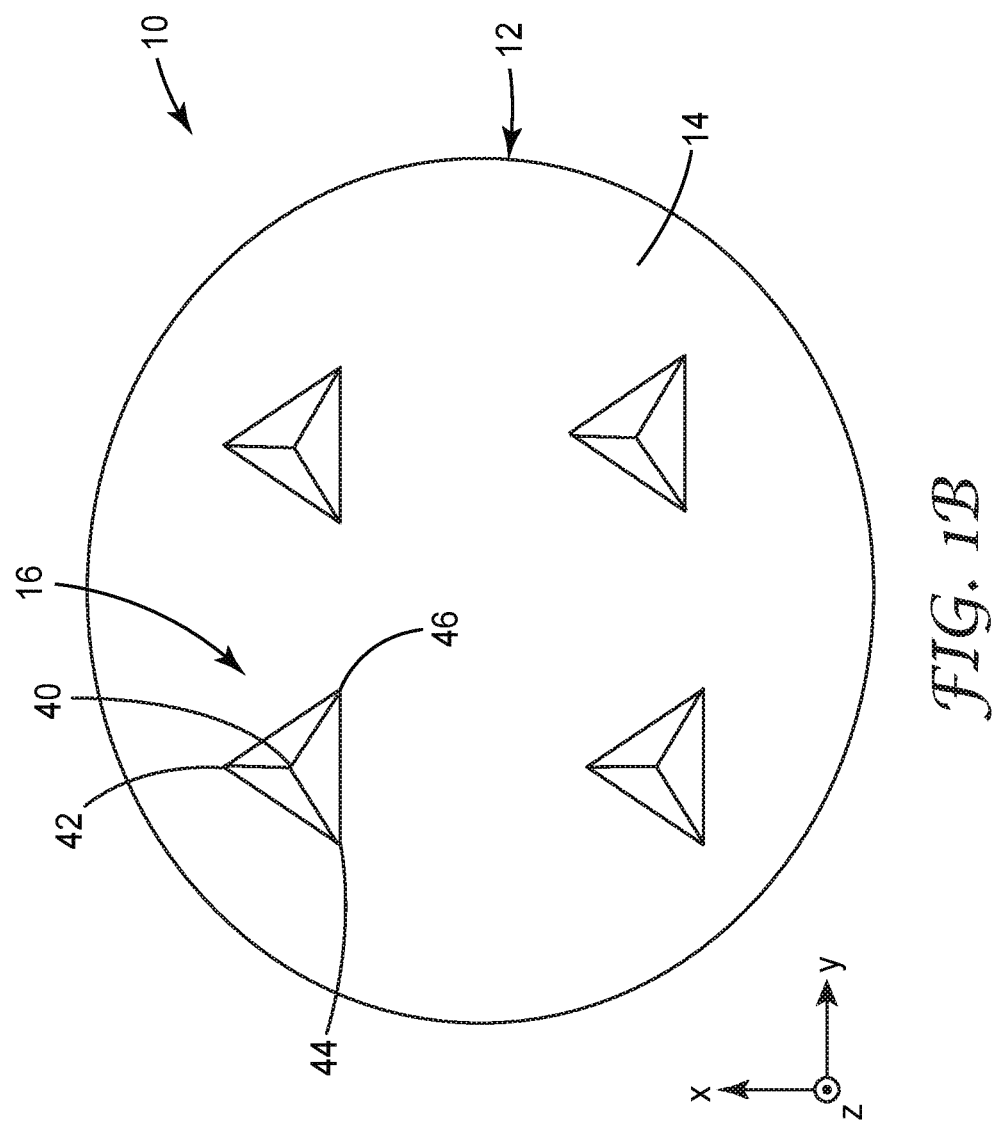
FIG. 1B is a top view of a coated abrasive article including the tetrahedral abrasive particles having a common rotation about the direction perpendicular to the major surface, in accordance with various embodiments.
Figure 1C:
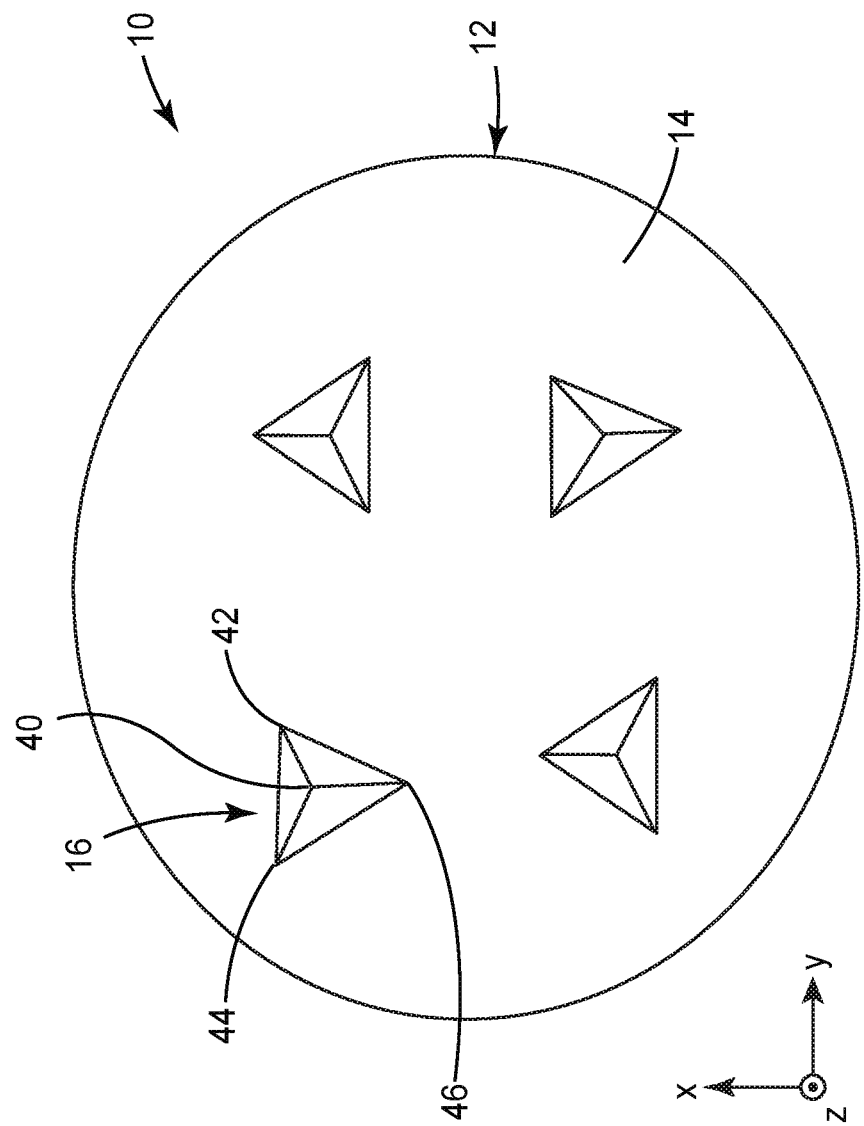
FIG. 1C is a top view of a coated abrasive article including the tetrahedral abrasive particles having different rotations about the direction perpendicular to the major surface, in accordance with various embodiments.

FIG. 1A is a sectional view of a coated abrasive article 10. FIGS. 1B and 1C are top views of the coated abrasive article 10. FIGS. 1A-1C will be discussed concurrently. The coated abrasive article 10 includes a backing 12 defining a substantially planar major surface along an x-y direction. The backing 12 has a first layer of binder, which may be referred to as a make coat 14, applied over a first surface of the backing 12. Attached or partially embedded in the make coat 14 are a plurality of tetrahedral abrasive particles 16. A second layer of binder, hereinafter referred to as a size coat 18, is dispersed over the tetrahedral abrasive particles 16. As explained further herein, a major portion of the tetrahedral abrasive particles 16 have at least one of three vertices (40, 42, and 44) oriented in substantially the same direction. In some examples this can increase the cut of the abrasive article compared to a corresponding abrasive article having fewer or no tetrahedral abrasive particles having at least one vertex oriented in substantially the same direction. The coated abrasive article 10 can be formed to be any suitable abrasive article. Examples of suitable abrasive articles include a grinding wheel (e.g., a depressed-center grinding wheel), a cut-off wheel, a continuous belt, or a portion thereof.

The backing 12 can be flexible or rigid. Examples of suitable materials for forming a flexible backing include a polymeric film, a metal foil, a woven fabric, a knitted fabric, paper, vulcanized fiber, a staple fiber, a continuous fiber, a nonwoven, a foam, a screen, a laminate, and combinations thereof. The backing 12 can be shaped to allow the coated abrasive article 10 to be in the form of sheets, discs, belts, pads, or rolls. In some embodiments, the backing 12 can be sufficiently flexible to allow the coated abrasive article 10 to be formed into a loop to make an abrasive belt that can be run on suitable grinding equipment.

The make coat 14 secures the tetrahedral abrasive particles 16 to the backing 12, and the size coat 18 can help to reinforce the tetrahedral abrasive particles 16. The make coat 14 and/or the size coat 18 can include a resinous adhesive. The resinous adhesive can include one or more resins chosen from a phenolic resin, an epoxy resin, a urea-formaldehyde resin, an acrylate resin, an aminoplast resin, a melamine resin, an acrylated epoxy resin, a urethane resin, and mixtures thereof.

Figure 2A:
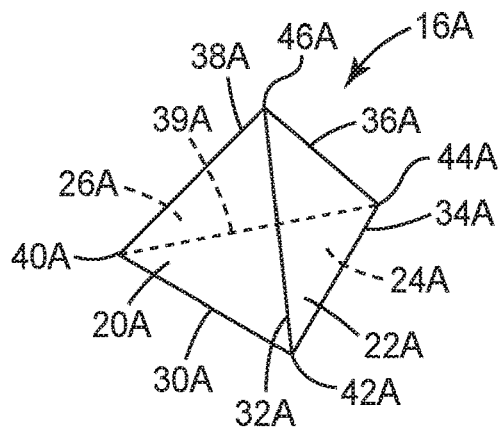
FIG. 2A is a perspective view of a tetrahedral abrasive particle having planar faces, in accordance with various embodiments.

FIGS. 2A-2E are perspective views of the tetrahedral abrasive particles 16. As shown in FIGS. 2A-2E, the tetrahedral abrasive particles 16 are shaped as regular tetrahedrons. As shown in FIG. 2A, a tetrahedral abrasive particle 16A has four faces (20A, 22A, 24A, and 26A) joined by six edges (30A, 32A, 34A, 36A, 38A, and 39A) terminating at four vertices (40A, 42A, 44A, and 46A). Each of the faces contacts the other three of the faces at the edges. While a regular tetrahedron (e.g., having six equal edges and four faces) is depicted in FIG. 2A, it will be recognized that other shapes are also permissible. For example, the tetrahedral abrasive particles 16 can be shaped as irregular (e.g., having edges of differing lengths) tetrahedrons.

Figure 2B:
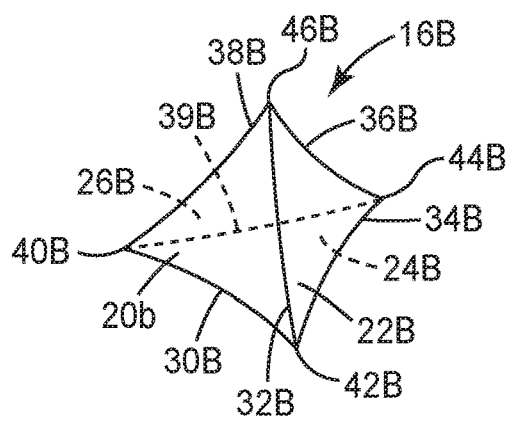
FIG. 2B is a perspective view of a tetrahedral abrasive particle having concave faces, in accordance with various embodiments.

Referring now to FIG. 2B, a tetrahedral abrasive particle 16B has four faces (20B, 22B, 24B, and 26B) joined by six edges (30B, 32B, 34B, 36B, 38B, and 39B) terminating at four vertices (40B, 42B, 44B, and 46B). Each of the faces is concave and contacts the other three of the faces at respective common edges. While a particle with tetrahedral symmetry (e.g., four rotational axes of threefold symmetry and six reflective planes of symmetry) is depicted in FIG. 2B, it will be recognized that other shapes are also permissible. For example, the tetrahedral abrasive particles 16 can have one, two, or three concave faces with the remainder being planar.

Figure 2C:
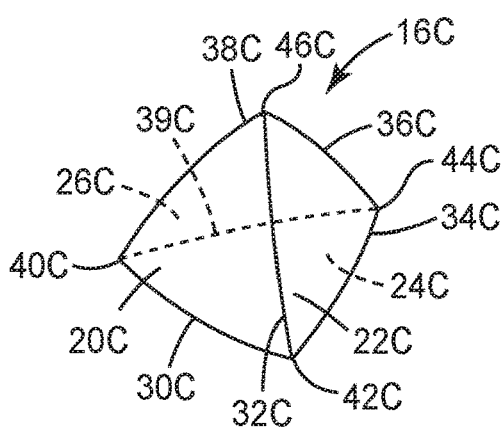
FIG. 2C is a perspective view of a tetrahedral abrasive particle having convex faces, in accordance with various embodiments.

Referring now to FIG. 2C, a tetrahedral abrasive particle 16C has four faces (20C, 22C, 24C, and 26C) joined by six edges (30C, 32C, 34C, 36C, 38C, and 39C) terminating at four vertices (40C, 42C, 44C, and 46C). Each of the faces is convex and contacts the other three of the faces at respective common edges. While a particle with tetrahedral symmetry is depicted in FIG. 2C, it will be recognized that other shapes are also permissible. For example, the tetrahedral abrasive particles 16 can have one, two, or three convex faces with the remainder being planar or concave.

Figure 2D:
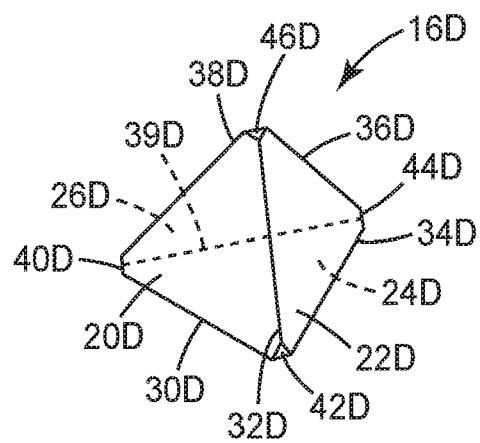
FIG. 2D is a perspective view of a tetrahedral abrasive particle having planar vertices, in accordance with various embodiments.

Referring now to FIG. 2D, a tetrahedral abrasive particle 16D has four faces (20D, 22D, 24D, and 26D) joined by six edges (30D, 32D, 34D, 36D, 38D, and 39D) terminating at four vertices (40D, 42D, 44D, and 46D). While a particle with tetrahedral symmetry is depicted in FIG. 2D, it will be recognized that other shapes are also permissible. For example, the tetrahedral abrasive particles 16 can have one, two, or three convex faces with the remainder being planar.

Figure 2E:
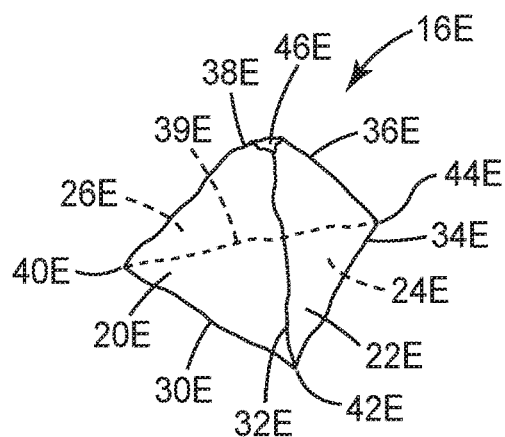
FIG. 2E is a perspective view of a tetrahedral abrasive particle having irregular faces, edges, and vertices, in accordance with various embodiments.

Deviations from the depictions in FIGS. 2A-2D can be present. An example of such a tetrahedral abrasive particle 16 is depicted in FIG. 2E, showing a tetrahedral abrasive particle 16E, which has four faces (20E, 22E, 24E, and 26E) joined by six edges (30E, 32E, 34E, 36E, 38E, and 39E) terminating at four vertices (40E, 42E, 44E, and 46E). Each of the faces contacts the other three of the faces at respective common edges. Each of the faces, edges, and vertices has an irregular shape.

Any one of the vertices (e.g., vertex 40) of the tetrahedral abrasive particles 16 can include a surface feature such as a substantially planar surface; a substantially planar surface having a triangular, rectangular, hexagonal, or polygonal perimeter; a concave surface; a convex surface; an aperture; a ridge; a line or a plurality of lines; a protrusion; a point; or a depression. The surface feature can be chosen to change the cut rate, reduce wear of the formed abrasive particles, or change the resulting finish of the abrasive article. A radius of curvature for each vertex can independently range from about 0.5 μm to about 80 μm, about 0.5 μm to about 60 μm, about 0.5 μm to about 20 μm, or about 1 μm to about 10 μm, or can be less than, equal to, or greater than about 0.5 μm, 1, 5, 10, 15, 20, 25, 30, 35, 40, 45, 50, 55, 60, 65, 70, 75, or 80 μm.

The tetrahedral abrasive particles 16 can have a combination of the above shape elements (e.g., convex sides, concave sides, irregular sides, and planar sides). Similarly, combinations of tetrahedral abrasive particles 16 having different shapes and/or sizes can be used.

In any of the tetrahedral abrasive particles 16, the edges can have the same length or different lengths. The length of any of the edges 30 can be any suitable length. As an example, the length of the edges 30 can be in a range of about 0.5 μm to about 2000 μm, about 1 μm to about 200 μm, or about 150 μm to about 180 μm, or can be less than, equal to, or greater than about 0.1 μm, 0.5 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 μm. The tetrahedral abrasive particles 16 can be the same size or different sizes.

In the coated abrasive article 10, the tetrahedral abrasive particles 16 can range from about 1 wt % to about 90 wt % of the abrasive layer, or about 10 wt % to about 50 wt % of the abrasive article, or can be less than, equal to, or greater than about 1 wt %, 5, 10, 15, 20, 25, 30, 35, 40, 45, 50, 55, 60, 65, 70, 75, 80, 85, or 90 wt %. As shown in FIGS. 1A-1C, a major portion of the tetrahedral abrasive particles 16 have at least one of the vertices (e.g., vertex 40) oriented in substantially the same direction. The major portion of the tetrahedral abrasive particles 16 can range from about 70% to about 100% of the tetrahedral abrasive particles 16, or about 90% to about 100%, or can be less than, equal to, or greater than about 70%, 75, 80, 85, 90, 95, or 100%.

As shown in FIGS. 1A-1C, the tetrahedral abrasive particles 16 are arranged such that each particle includes a vertex (e.g., vertex 40) that is oriented away from the backing 12 along a direction substantially perpendicular to the major surface in a z-direction. As shown in FIGS. 1A-1C, the vertex 40 is substantially aligned with the z-direction. In other examples, the vertex 40 can deviate from a true alignment in the z-direction. This can be caused by the tetrahedral abrasive particles 16 resting on an uneven portion the backing 12 or on a filler particle.

In addition to the tetrahedral abrasive particles 16 having vertices 40 aligned in the z-direction, the particles 16 can have three vertices aligned in the same or different x-y directions. This is shown in FIGS. 1B and 1C. In FIG. 1B, each of the tetrahedral abrasive particles 16 has vertices 42, 44, and 46 aligned in the same x-y direction. Alternatively, in FIG. 1C, various tetrahedral abrasive particles 16 are rotated about the z-direction to various degrees such that the vertices 42, 44, and 46 of at least two abrasive particles are not aligned. The portion of the tetrahedral abrasive particles 16 having three of the vertices oriented in substantially the same direction can range from about 1% to about 100% of the tetrahedral abrasive particles 16, or about 25% to about 75%, or can be less than, equal to, or greater than about 1%, 5, 10, 15, 20, 25, 30, 35, 40, 45, 50, 55, 60, 65, 70, 75, 80, 85, 90, 95, or 100%.

The tetrahedral abrasive particles 16 can be distributed over about 1% to about 95% of a surface area of a first side of the backing 12, about 10% to about 50% of the surface area of the first side of the backing, or less than, equal to, or greater than about 1%, 5, 10, 15, 20, 25, 30, 35, 40, 45, 50, 55, 60, 65, 70, 75, 80, 85, 90, or 95% of the surface area of the first side of the backing 12. The degree to which the tetrahedral abrasive particles 16 are distributed over the backing can depend on the desired characteristics of the abrasive article 10 (e.g., cut rate or finish). With respect to location on the backing 12, the tetrahedral abrasive particles 16 can be randomly distributed or precisely placed according to a pattern.

A surface finish or surface roughness of the abrasive article 10 can be measured in many suitable ways. For example, the surface finish can be measured to obtain an arithmetical mean roughness (RA) value (micrometers) or a ten-point mean roughness (RZ) value (micrometers). As an example, an RA value of the article can be in a range from about 0.1µ to about 5µ, or about 0.2µ to about 4µ, or can be less than, equal to, or greater than about 0.1µ, 0.2, 0.4, 0.6, 0.8, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, or 5.0µ. As another example, an RZ value of the article can range from about 4.0µ to about 15.0µ or about 6.0µ to about 13.0µ, or can be less than, equal to, or greater than about 4.0µ, 4.4, 4.8, 5.2, 5.6, 6.0, 6.4, 6.8, 7.2, 7.6, 8.0, 8.4, 8.8, 9.2, 9.6, 9.8, 10.2, 10.6, 11.0, 11.4, 11.8, 12.2, 12.6, 13.0, 13.4, 13.8, 14.2, 14.6, or 15.0µ.

Figure 3:
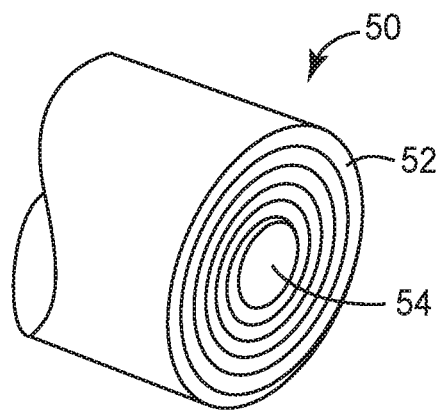
FIG. 3 is a perspective view of a convolute abrasive wheel, in accordance with various embodiments.
Figure 4A:
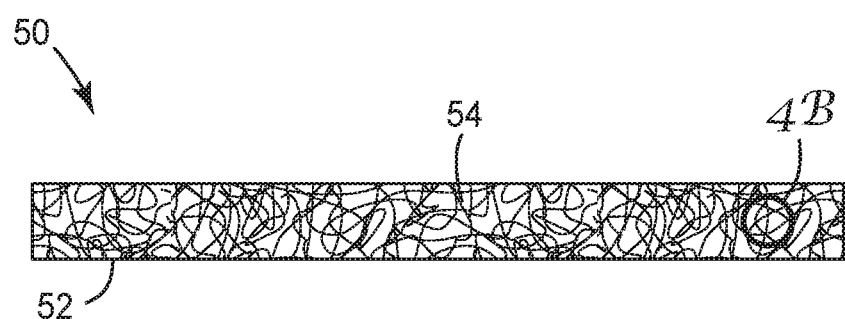
FIG. 4A is a side view of a nonwoven abrasive, in accordance with various embodiments.
Figure 4B:
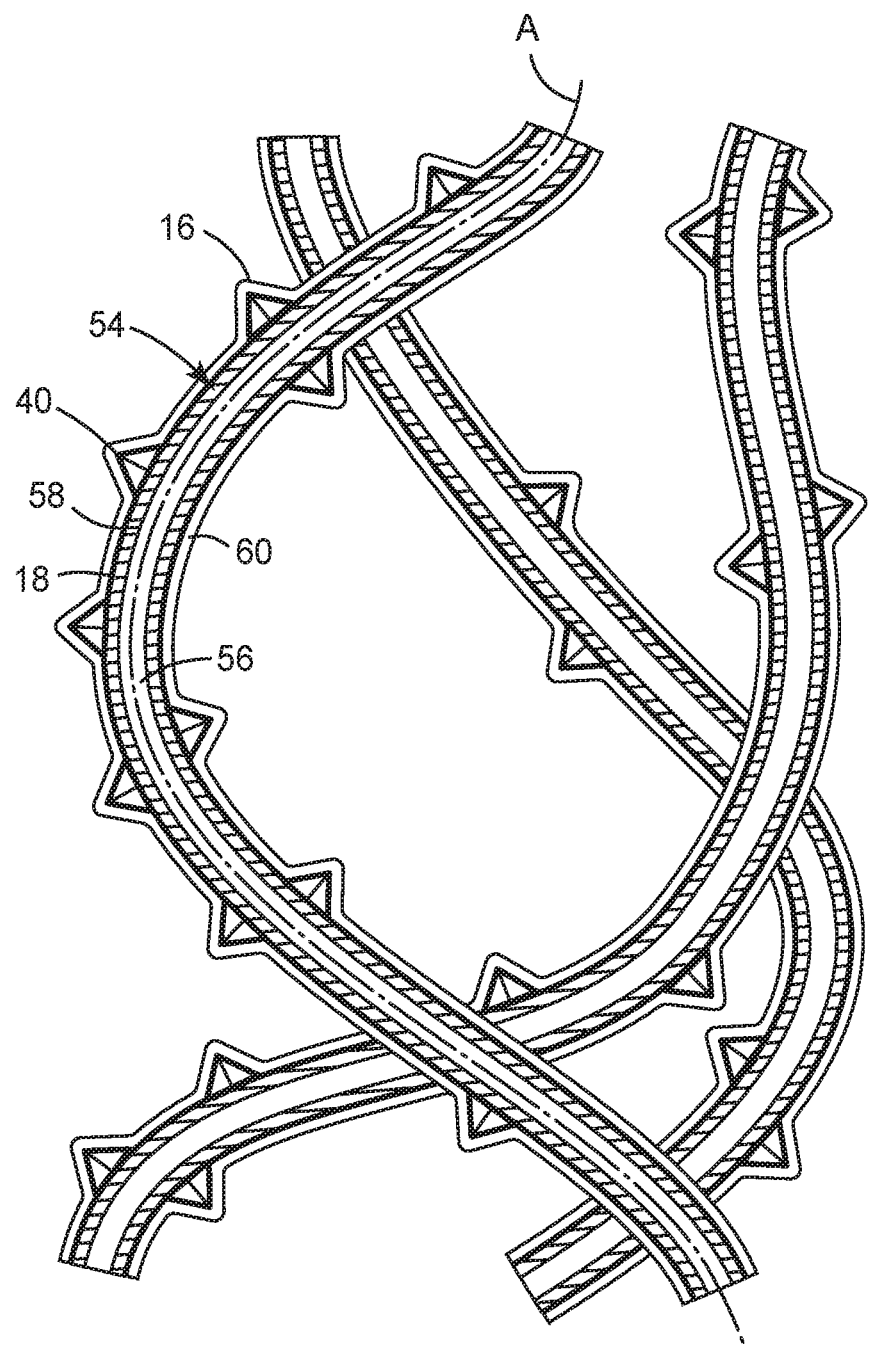
FIG. 4B is a zoomed view of a portion of the nonwoven abrasive of FIG. 4A, in accordance with various embodiments.

FIGS. 1A-1C show embodiments in which the abrasive article 10 is a coated abrasive article. However, according to further embodiments of the present disclosure, additional abrasive articles are contemplated. For example, FIGS. 3, 4A and 4B show an embodiment of the abrasive article 10 as a convolute abrasive wheel. As shown, a convolute abrasive wheel 50 includes a nonwoven abrasive 52 which is wound under tension about a core 54.

FIG. 4A shows the nonwoven abrasive 52 separated from the core 54. FIG. 4B shows a zoomed view of a portion of the nonwoven abrasive 52. FIGS. 4A and 4B show many of the same components and will be discussed concurrently. As shown the convolute abrasive wheel 50 includes the nonwoven abrasive 52 having opposed substantially planar surfaces. The nonwoven abrasive 52 can be a lofty, open, low-density, fibrous web that includes a plurality of fibers 54, which are shown in more detail in FIG. 4B. As shown, the fibers 54 of the nonwoven abrasive 52 form a backing of the convolute abrasive wheel 50. The fibers 54 can be any suitable fiber such as a vulcanized fiber, a staple fiber, a continuous fiber. The fibers 54 can have any suitable dimensions. For example, the fibers 54 can have a length of at least about 20 millimeters (mm), at least about 30 mm, or at least about 40 mm, and less than about 110 mm, less than about 85 mm, or less than about 65 mm, although shorter and longer fibers (e.g., continuous fibers or filaments) may also be useful. The fibers 54 can have a fineness or linear density of at least about 1.7 decitex (dtex, e.g., grams/10000 meters), at least about 6 dtex, or at least about 17 dtex, and less than about 560 dtex, less than about 280 dtex, or less than about 120 dtex, although fibers 54 having lesser or greater linear densities may also be useful. Mixtures of the fibers 54 with differing linear densities may be useful, for example, to provide an abrasive article that upon use will result in a specifically preferred surface finish.

As shown in FIG. 4B, each of the fibers 54 have an outer or major surface 56. A first resin layer 58, which includes a curable resin such as any of those described with respect to the make coat 14 is applied to the major surface 56. The abrasive particles 16 are then applied to the fibers 54 either after the first resin layer 58 is coated or simultaneously with the first resin layer 58. The size coat 18 including a phenolic resin can be applied over the first resin layer coat 58 and the abrasive particles 16. Thereafter, the first resin layer coat 58 and the first size coat 18 are either partially cured together until the resins are no longer wet and tacky, or sequentially partially cured by individual application and heating of each layer prior to applying a second size coat 60 comprising a polyurethane.

As shown in FIG. 4B, a major portion of the vertices (e.g., vertex 40) of the tetrahedral shaped abrasive particles 16 are aligned in substantially the same direction. That is, relative to a nonlinear axis A, which matches the profile of the major surface 56, the individual vertices (e.g., vertex 40) of a major portion of the tetrahedral abrasive particles 16 are oriented in a direction substantially perpendicular to the central axis A and the major surface 56. The rotation of the individual abrasive particles 16 about the major surface 56 can be controlled to achieve any suitable orientation.

Figure 5:
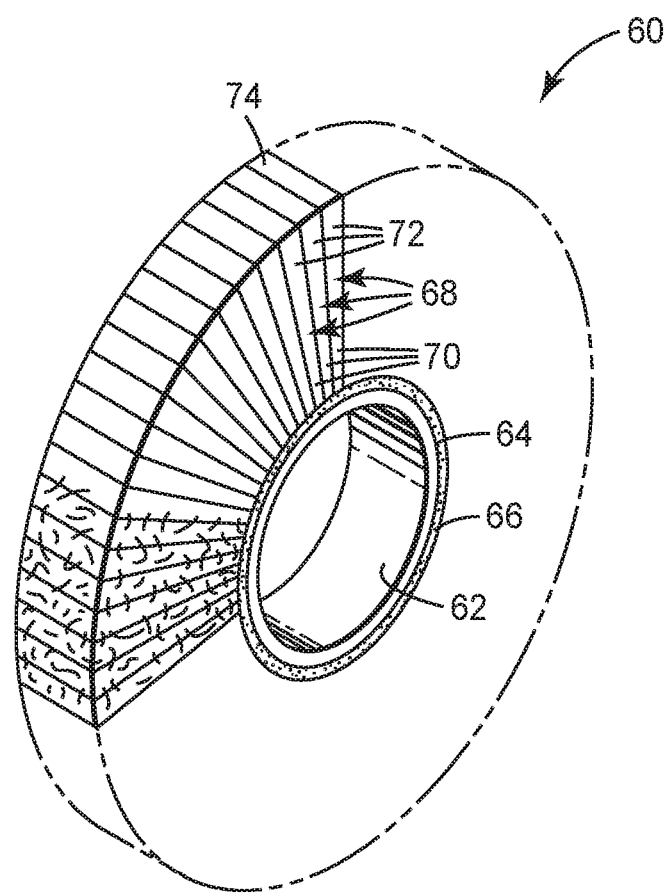
FIG. 5 is a perspective view of a flap brush, in accordance with various embodiments.

A further example of a suitable abrasive article includes a flap brush. FIG. 5 is a perspective view of a flap brush 60, including a cylindrical central core 62, a layer of an adhesive 66 coated on the outer peripheral surface 64 of the core 62, and a plurality of radially extending abrasive flaps 68. The core 62 can be a paper and phenolic resin composite or a polyester and glass fiber composite. The adhesive 66 can be, for example, an epoxy, and is coated over the outer surface 64 of core 62 to adhere abrasive flaps 68 to core 62.

The abrasive flaps 68 are the nonwoven abrasive flaps 52 as depicted herein at FIGS. 4A and 4B. The abrasive flaps 68 are adhered at the core end 70 to the core 62 by the adhesive layer 16. The abrasive flaps 68 extend radially outwardly from the core 62, and are tightly packed to minimize relative movement between the adjacent abrasive flaps 68. For example, in an embodiment of the flap brush 60 having a 15.2 cm (6 in) outer diameter and including one hundred and twenty-eight of the nonwoven abrasive flaps 68, the flaps 68 can be compressed at the core end 70 to approximately 10% of their uncompressed thickness and at their outer end 72 to about 30% of their uncompressed thickness. In this arrangement, the outer ends 72 of each of the abrasive flaps together form the flap brush outer peripheral surface 74, which may be rotatively applied to a workpiece surface.

In some examples, the tetrahedral abrasive particles 16 can be made according to a multi-operation process. The process can be carried out using any ceramic precursor dispersion material. Briefly, the process can include the operations of making either a seeded or non-seeded ceramic precursor dispersion that can be converted into a corresponding ceramic (e.g., a boehmite sol-gel that can be converted to alpha alumina); filling one or more mold cavities having the desired outer shape of the shaped abrasive particle with a ceramic precursor dispersion; drying the ceramic precursor dispersion to form precursor tetrahedral abrasive particles; removing the precursor tetrahedral abrasive particles from the mold cavities; calcining the precursor tetrahedral abrasive particles to form calcined, precursor tetrahedral abrasive particles; and then sintering the calcined, precursor tetrahedral abrasive particles to form the tetrahedral abrasive particles 16. The process will now be described in greater detail in the context of alpha-alumina-containing tetrahedral abrasive particles.

The process can include the operation of providing either a seeded or non-seeded dispersion of a ceramic precursor that can be converted into ceramic. The ceramic precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the ceramic precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the ceramic precursor dispersion in some embodiments contains from 30 percent to 50 percent, or 40 percent to 50 percent, by weight solids.

Examples of suitable ceramic precursor dispersions include zirconium oxide sols, vanadium oxide sols, cerium oxide sols, aluminum oxide sols, and combinations thereof.

Suitable aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area. Additionally, in some embodiments, suitable abrasive particle precursor materials include fine abrasive particles that, upon sintering, form a single abrasive particle. In some embodiments, the abrasive particle precursor materials can include, alone or in addition, fine alpha alumina particles that upon sintering fuse together to form a sintered alpha alumina ceramic body, e.g., as disclosed in U.S. Publ. Pat. Appln. No. 2016/0068729 A1 (Erickson et al.)

The physical properties of the resulting tetrahedral abrasive particles can generally depend upon the type of material used in the ceramic precursor dispersion. As used herein, a "gel" is a three-dimensional network of solids dispersed in a liquid.

The ceramic precursor dispersion can contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, such as water-soluble salts. They can include a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the ceramic precursor dispersion can be varied.

The introduction of a modifying additive or precursor of a modifying additive can cause the ceramic precursor dispersion to gel. The ceramic precursor dispersion can also be induced to gel by application of heat over a period of time to reduce the liquid content in the dispersion through evaporation. The ceramic precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the ceramic precursor dispersion to produce a more stable hydrosol or colloidal ceramic precursor dispersion. Suitable peptizing agents are monoprotic acids or acid compounds such as acetic acid, hydrochloric acid, formic acid, and nitric acid. Multiprotic acids can also be used, but they can rapidly gel the ceramic precursor dispersion, making it difficult to handle or to introduce additional components. Some commercial sources of boehmite contain an acid titer (such as absorbed formic or nitric acid) that will assist in forming a stable ceramic precursor dispersion.

The ceramic precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tool, which can be, for example, a belt, a sheet, a continuous web, a coating roll such as a rotogravure roll, a sleeve mounted on a coating roll, or a die. In one example, the production tool can include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one example, the entire tooling is made from a polymeric or thermoplastic material. In another example, the surfaces of the tooling in contact with the ceramic precursor dispersion while the ceramic precursor dispersion is drying, such as the surfaces of the plurality of cavities, comprise polymeric or thermoplastic materials, and other portions of the tooling can be made from other materials. A suitable polymeric coating can be applied to a metal tooling to change its surface tension properties, by way of example.

A polymeric or thermoplastic production tool can be replicated off a metal master tool. The master tool can have the inverse pattern of that desired for the production tool. The master tool can be made in the same manner as the production tool. In one example, the master tool is made out of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that can distort the thermoplastic production tool, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

The cavities have a specified three-dimensional shape to make the tetrahedral abrasive particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

A further operation involves filling the cavities in the mold with the ceramic precursor dispersion (e.g., by a conventional technique). In some examples, a knife roll coater or vacuum slot die coater can be used. A mold release agent can be used to aid in removing the particles from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the ceramic precursor dispersion such that between about 0.1 mg/in$^2$ (0.6 mg/cm$^2$) to about 3.0 mg/in$^2$ (20 mg/cm$^2$), or between about 0.1 mg/in$^2$ (0.6 mg/cm$^2$) to about 5.0 mg/in$^2$ (30 mg/cm$^2$), of the mold release agent is present per unit area of the mold when a mold release is desired. In some embodiments, the top surface of the mold is coated with the ceramic precursor dispersion. The ceramic precursor dispersion can be pumped onto the top surface.

In a further operation, a scraper or leveler bar can be used to force the ceramic precursor dispersion fully into the cavity of the mold. The remaining portion of the ceramic precursor dispersion that does not enter the cavity can be removed from the top surface of the mold and recycled. In some examples, a small portion of the ceramic precursor dispersion can remain on the top surface, and in other examples the top surface is substantially free of the dispersion. The pressure applied by the scraper or leveler bar can be less than 100 psi (0.6 MPa), less than 50 psi (0.3 MPa), or even less than 10 psi (60 kPa). In some examples, no exposed surface of the ceramic precursor dispersion extends substantially beyond the top surface.

In those examples, where it is desired to have the exposed surfaces of the cavities result in planar faces of the tetrahedral abrasive particles 16, it can be desirable to overfill the cavities (e.g., using a micronozzle array) and slowly dry the ceramic precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of between about 40 to 50 percent solids and a polypropylene mold, the drying temperatures can be between about 90° C. to about 165° C., or between about 105° C. to about 150° C., or between about 105° C. to about 120° C. Higher temperatures can lead to improved production speeds but can also lead to degradation of the polypropylene tooling, limiting its useful life as a mold.

During drying, the ceramic precursor dispersion shrinks, often causing retraction from the cavity walls. For example, if the cavities have planar walls, then the resulting tetrahedral abrasive particles can tend to have at least three concave major sides. It is presently discovered that by making the cavity walls concave (whereby the cavity volume is increased) it is possible to obtain tetrahedral abrasive particles that have at least three substantially planar major sides. The degree of concavity generally depends on the solids content of the ceramic precursor dispersion.

A further operation involves removing resultant precursor tetrahedral abrasive particles from the mold cavities. The precursor tetrahedral abrasive particles can be removed from the cavities by using the following processes alone or in combination on the mold: gravity, vibration, ultrasonic vibration, vacuum, or pressurized air to remove the particles from the mold cavities.

The precursor tetrahedral abrasive particles can be further dried outside of the mold. If the ceramic precursor dispersion is dried to the desired level in the mold, this additional drying step is not necessary. However, in some instances it can be economical to employ this additional drying step to minimize the time that the ceramic precursor dispersion resides in the mold. The precursor tetrahedral abrasive particles will be dried from 10 to 480 minutes, or from 120 to 400 minutes, at a temperature from 50° C. to 160° C., or 120° C. to 150° C.

A further operation involves calcining the precursor tetrahedral abrasive particles. During calcining, essentially all the volatile material is removed, and the various components that were present in the ceramic precursor dispersion are transformed into metal oxides. The precursor tetrahedral abrasive particles are generally heated to a temperature from 400° C. to 800° C., and maintained within this temperature range until the free water and over 90 percent by weight of any bound volatile material are removed. In an optional step, it can be desired to introduce the modifying additive by an impregnation process. A water-soluble salt can be introduced by impregnation into the pores of the calcined, precursor tetrahedral abrasive particles. Then the precursor tetrahedral abrasive particles are pre-fired again.

A further operation involves sintering the calcined, precursor tetrahedral abrasive particles to form the tetrahedral shaped abrasive particles 16. Prior to sintering, the calcined, precursor tetrahedral abrasive particles are not completely densified and thus lack the desired hardness to be used as tetrahedral abrasive particles. Sintering takes place by heating the calcined, precursor tetrahedral abrasive particles to a temperature of from 1000° C. to 1650° C. The length of time for which the calcined, precursor tetrahedral abrasive particles can be exposed to the sintering temperature to achieve this level of conversion depends upon various factors, but from five seconds to 48 hours is typical.

In another embodiment, the duration of the sintering step ranges from one minute to 90 minutes. After sintering, the tetrahedral abrasive particles can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the ceramic precursor dispersion to remove sludge and/or waste. Moreover, the process can be modified by combining two or more of the process steps if desired.

Another process for forming tetrahedral abrasive particles 16 can include using a slurry including non-colloidal solid particles and a liquid vehicle. The non-colloidal solid particles can be suspended in the liquid vehicle; however, it is also acceptable to have some settling of the non-colloidal solid particles. At least some of the non-colloidal solid particles include at least one of alpha alumina or a precursor thereof. In some embodiments, the non-colloidal solid particles comprise alpha alumina particles, alpha alumina precursor particles, or a combination thereof. In some embodiments, substantially all (e.g., at least 95 percent by weight or at least 99 percent by weight), or all, of the non-colloidal solid particles comprise alpha alumina particles, alpha alumina precursor particles, or a combination thereof.

The alpha alumina particles and non-colloidal alpha alumina precursor particles, taken individually, or collectively if both are present, may comprise at least 30, 35, 40, 50, or even at least 55 percent by volume of the slurry. The slurry may further comprise one or more optional additives such as, for example, thickener(s) thixotrope(s), dispersant(s), wetting agent(s), defoamer(s), coupling agent(s), modifying agent(s) or precursor(s) thereof, nucleating agent(s), peptizing agent(s), and/or mold release agent(s). Useful thickeners include: organic thickener(s) such as, for example, guar gum, sodium carboxymethyl cellulose, and/or carbomers; and inorganic thickeners such as, for example, colloidal boehmite.

Modifying additives can function to enhance some desirable property of the tetrahedral shaped abrasive particles 16 or increase the effectiveness of the subsequent sintering step. Modifying additives or precursors of modifying additives can be in the form of micron-scale and submicron-scale particulates, nano-colloids (e.g., nanometer-scale colloids), soluble salts, typically water soluble salts and non-soluble salts. They can include a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof.

Nucleating agents suitable for inclusion in the slurry can include, for example, fine particles of alpha alumina, alpha ferric oxide or its precursor, titanium oxides and titanates, chrome oxides, or any other material that will nucleate the transformation. The amount of nucleating agent, if used, is sufficient to effect the transformation of alpha alumina. Nucleating alpha alumina precursor dispersions is disclosed in U.S. Pat. No. 4,744,802 (Schwabel).

If a colloidal boehmite thickener is included in the slurry, a peptizing agent may be useful for providing stability. Suitable peptizing agents include monoprotic acids or acid compounds such as acetic acid, hydrochloric acid, formic acid, and nitric acid. Multiprotic acids can also be used but they may rapidly gel the slurry, making it difficult to handle or to introduce additional components thereto.

In some embodiments, the non-colloidal solid particles comprise alpha alumina particles. The alpha alumina particles may be, for example, crushed or shaped. Useful, alpha alumina particles may include metal ions other than aluminum ions (e.g., $Fe^{3+}$ ions). Examples of suitable alpha aluminas include alpha alumina white fused alumina, and brown fused alumina In some embodiments, the non-colloidal solid particles include alpha alumina precursor particles. As used herein, the term "alpha alumina precursor" can refer to a material, other than alpha alumina, that can be at least partially (e.g., completely) converted to alpha alumina by sufficient heating. Examples of suitable alpha alumina precursors include, boehmite (γ-AlO(OH)), diaspore (α-AlO(OH)), bayerite (i.e., α-Al(OH)$_3$), and gibbsite and its polymorphs (e.g., doyleite and nordstrandite).

The non-colloidal solid particles may be monomodal or polymodal (e.g., bimodal). For example, the non-colloidal solid particles may have a bimodal distribution wherein about 95 percent of the non-colloidal solid particles may have mode of about 0.7 microns and about 5 percent of the non-colloidal solid particles have a mode of about 2-3 microns.

Advantageously, methods and tetrahedral shaped abrasive particles 16 described herein are tolerant of modest levels of sodium ions in the slurry components and resultant tetrahedral shaped abrasive particles 16, in contrast to traditional sol-gel methods in which even modest levels of sodium ions tend to markedly degrade abrasive properties of the tetrahedral shaped abrasive particles 16 containing sodium ions. For example, good abrasive properties may be obtained even when the tetrahedral shaped abrasive particles 16 contain, on an equivalent basis, up to about 2.5 by weight of sodium oxide, from 0.03 to 2.5 percent by weight of sodium oxide, or from 0.05 to 2.5 percent by weight of sodium oxide, based on the total weight of the tetrahedral shaped abrasive particles 16. In some embodiments, the tetrahedral shaped abrasive particles 16 contain, on an equivalent basis, from 0.05 to 0.5 percent by weight of sodium oxide, based on the total weight of the tetrahedral shaped abrasive particles 16.

The liquid vehicle may include water and/or organic solvent. The liquid vehicle includes water in an amount of at least 50, 60, 70, 80, 90, or even at least 95 percent by weight of the liquid vehicle. Any organic solvent in the liquid vehicle is water-soluble, or at least water-miscible. Examples include lower alcohols (e.g., methanol, ethanol, propanol), ethers (e.g., glyme, and diglyme), and lactams (e.g., 2-pyrrolidone).

The particles of alpha alumina and/or alpha alumina precursor included in the slurry have an average particle size in the range of from 0.4 to 2.0 microns, or in the range of from 0.4 to 0.8 microns, although this is not a requirement. In some embodiments bimodal or even trimodal particle size distributions are useful. In this case in addition to fine particles, significantly larger size ones can be present (e.g. average particle size of 0.7 is complimented with few percent of 2-5 micron particles). A density of the shaped abrasive particles 16 can be at least 92 percent of a true density.

At least a portion of the slurry is next contacted with a substrate to form shaped bodies. The substrate can be any of the tools described above for forming the tetrahedral shape.

After forming the slurry into shaped bodies, the shaped bodies are at least partially dried to provide shaped abrasive precursor particles. This may be accomplished, for example, using an oven, heated platen, heat gun, or infrared heater. As used herein, the term "drying" refers to removal of at least a portion of the liquid vehicle, which may or may not specifically refer to removal of water.

The liquid vehicle can be removed at a fast evaporation rate. In some embodiments, removal of the liquid vehicle by evaporation occurs at temperatures above the boiling point of the liquid vehicle. An upper limit to the drying temperature may depend on the material that the mold is made from. For polypropylene tooling, the temperature should generally be less than the melting point of polypropylene, preferably less than the softening point.

During drying, the slurry shrinks, which may cause retraction from the cavity walls. For example, if the cavities have planar walls, then the resulting tetrahedral shaped abrasive particles 16 may tend to have at least three concave major sides. By making the cavity walls concave (whereby the cavity volume is increased) it is possible to obtain the tetrahedral shaped abrasive particles 16 that have at least three substantially planar major sides. The degree of concavity required generally depends on the solids content of the slurry.

Next, at least a portion of the shaped abrasive precursor particles are separated from the substrate having cavities that impart the tetrahedral shape onto the particles. This may be accomplished, for example, by gravity, vacuum, pressurized air, or a mechanical method such as, for example, vibrating (e.g., ultrasonic vibration) flexing and/or beating, however other methods may also be used.

Once separated from the substrate, at least a portion of the shaped abrasive precursor particles are converted into tetrahedral shaped abrasive particles 16.

The shaped abrasive precursor particles can be then calcined. During calcining, essentially all the volatile material is removed, and the various components that were present in the slurry are transformed into metal oxides. The shaped abrasive precursor particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, shaped abrasive precursor particles. Then the shaped abrasive precursor particles are pre-fired again. This option is further described in U.S. Pat. No. 5,164,348 (Wood).

Whether calcined or not, the shaped abrasive precursor particles (or calcined shaped abrasive precursor particles) are sintered to form the tetrahedral shaped abrasive particles 16 comprising alpha alumina. The tetrahedral shaped abrasive particles 16 are ceramic after sintering. Prior to sintering, the (optionally calcined) shaped abrasive precursor particles are not completely densified and thus lack the desired hardness to be used as tetrahedral shaped abrasive particles 16. Sintering can take place by heating the (optionally calcined) shaped abrasive precursor particles to a temperature of from 1000° C. to 1650° C. The heating time required to achieve densification depends upon various factors, but times of from five seconds to 48 hours are acceptable. Additional details on this method can be found in U.S. Published Patent Application No. 2015/0267097 (Rosenflanz)

The abrasive layer can include additional abrasive particles such as crushed abrasive particles. If present, the crushed abrasive particles can range from about 5 wt % to about 96 wt % of the abrasive layer, or about 15 wt % to about 50 wt %, or can be less than, equal to, or greater than about 5 wt %, 10, 15, 20, 25, 30, 35, 40, 45, 50, 55, 60, 65, 70, 75, 80, 85, 90, or 96 wt %. Examples of suitable crushed abrasive particles include, for example, crushed particles of fused aluminum oxide, heat-treated aluminum oxide, white fused aluminum oxide, ceramic aluminum oxide materials such as those commercially available under the trade designation 3M CERAMIC ABRASIVE GRAIN from 3M Company of St. Paul, Minn., black silicon carbide, green silicon carbide, titanium diboride, boron carbide, tungsten carbide, titanium carbide, diamond, cubic boron nitride, garnet, fused alumina zirconia, sol-gel derived abrasive particles, iron oxide, chromia, ceria, zirconia, titania, silicates, tin oxide, silica (such as quartz, glass beads, glass bubbles, and glass fibers), silicates (such as talc, clays (e.g., montmorillonite), feldspar, mica, calcium silicate, calcium metasilicate, sodium aluminosilicate, and sodium silicate), flint, and emery.

The abrasive layer can further include secondary formed abrasive particles. The secondary formed abrasive particles can have a non-tetrahedral shape such as an equilateral triangular plate shape. If present, the secondary formed abrasive particles can range from about 5 wt % to about 95 wt % of the abrasive layer, or about 20 wt % to about 70 wt % of the abrasive layer, or can be less than, equal to, or greater than 5 wt %, 10, 15, 20, 25, 30, 35, 40, 45, 50, 55, 60, 65, 70, 75, 80, 85, 90, or 95 wt %.

The abrasive layer can further include additives, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate, and combinations thereof. Suitable examples of grinding aids include particulate materials that have an effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds can break down during abrading and release a halogen acid or a gaseous halide compound. Examples of such materials include chlorinated waxes, such as tetrachloronaphthalene and pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium.

Other grinding aids include sulfur, organic sulfur compounds, graphite, and metallic sulfides. It is also within the scope of this disclosure to use a combination of different grinding aids; in some instances, this can produce a synergistic effect. In one embodiment, the grinding aid is cryolite or potassium tetrafluoroborate. The amount of such additives can be adjusted to give desired properties. If present, the additives can range from about 5 wt % to about 95 wt % of the abrasive layer, or about 20 wt % to about 70 wt % of the abrasive layer, or can be less than, equal to, or greater than 5 wt %, 10, 15, 20, 25, 30, 35, 40, 45, 50, 55, 60, 65, 70, 75, 80, 85, 90, or 95 wt %.

Various methods can be used to make any of the abrasive articles of the present disclosure. For example, the coated abrasive article 10, can be formed by applying the make coat 14 on the backing. The make coat 14 can be applied by any suitable technique such as roll coating.

The abrasive particles 16 can then be deposited on the make coat 14. Alternatively, the abrasive particles 16 and the make coat formulation can be mixed to form a slurry, which is then applied to the backing 12. If the coated abrasive article 10 includes tetrahedral abrasive particles 16, crushed abrasive particles, and secondary formed abrasive particles, those particles can be applied as discrete groups sorted by particle type or together. Once the abrasive particles are deposited on the backing 12, the make coat 14 is cured at an elevated temperature or at room temperature for a set amount of time and the abrasive particles adhere to the backing 12. A size coat can then be optionally applied over the coated abrasive article.

The abrasive particles 16 can be deposited on the backing 12 through any suitable technique. For example, the abrasive particles 16 can be deposited through a drop-coating technique or an electrostatic-coating technique onto the backing 12. In drop-coating, the abrasive particles 16 are free-form deposited on the make coat 14. In an example of an electrostatic-coating technique, an electrostatically charged vibratory feeder can be used to propel abrasive particles 16 off of a feeding surface towards a conductive member located behind the backing 12. In some embodiments, the feeding surface can be substantially horizontal and the coated backing can be traveling substantially vertically. The abrasive particles 16 pick up a charge from the feeder and are drawn towards the backing by the conductive member.

In the case of tetrahedral abrasive particles 16, the high percentage of those particles with a vertex oriented away from the backing in a direction substantially perpendicular to the major surface (e.g., along the z-direction) can be achieved through either the drop-coating or electrostatic-coating techniques. Without intending to be bound to any theory, the inventors believe that the high degree of symmetry of the tetrahedral abrasive particles 16 results in a vertex (e.g., vertex 40) being oriented away from the backing. This is because each vertex (e.g., vertex 40) is opposite one of the faces (e.g., face 22). There is a high probability that the tetrahedral abrasive particle 16 will come to rest on the backing 12 such that one of the faces is in contact with the backing 12, resulting in the vertex (e.g., vertex 40) opposite the face (e.g., face 22) being oriented away from the backing 12.

As described herein with respect to the tetrahedral abrasive particles 16, a portion of those abrasive particles can have three of the vertices oriented in substantially the same direction (e.g., along the x-y direction). This can be achieved, for example, by employing a precision apertured screen in conjunction with the depositing technique. The apertured screen can be configured to position the tetrahedral abrasive particles 16 into a specific rotation such that the tetrahedral abrasive particles 16 can only fit into the precision apertured screen in a few specific orientations. For example, a rectangular opening just slightly bigger than the cross section of a tetrahedral abrasive particle 16 can be included in a rectangular plate that will orient the tetrahedral abrasive particle 16 in one of two possible 180-degree opposed z-direction rotational orientations.

In addition to controlling the rotation of the tetrahedral abrasive particles 16, the screens can help to arrange the tetrahedral abrasive particles 16 into a predetermined pattern. For example, the apertures of the screen can be arranged as a group of concentric circles or parallel lines. A pattern of tetrahedral abrasive particles 16 arranged in concentric circles can be well suited for abrasive articles shaped as a wheel that rotates in operation. A pattern of tetrahedral abrasive particles 16 arranged in parallel lines can be well suited for abrasive articles shaped as a continuous belt.

In examples where a perforated screen is used, the backing 12 can be coated with a make coat 14 and positioned parallel to the precision apertured screen surface including the tetrahedral abrasive particles 16 with the make coat 14 facing the tetrahedral abrasive particles in the apertures. Thereafter, the coated backing and the precision apertured screen are brought into contact to adhere the tetrahedral abrasive particles 16 to the make coat 14. The tetrahedral abrasive particles 16 are released, for example, by releasing a retaining member on the screen or eliminating an electrostatic field. The tetrahedral abrasive particles 16 are then deposited on the make coat 14.

The abrasive articles described herein can be used to abrade a workpiece. Abrading a workpiece can include frictionally contacting at least a portion of the coated abrasive article 10 with a surface of the workpiece. Once the coated abrasive article 10 is in contact with the workpiece, at least one of the workpiece or the abrasive article 10 is moved with respect to the other. This results in abrasion of at least a portion of the surface of the workpiece.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modifications and variations of the concepts herein disclosed may be resorted to by those of ordinary skill in the art, and that such modifications and variations are considered to be within the scope of embodiments of the present disclosure.

EXAMPLES

Various embodiments of the present disclosure can be better understood by reference to the following Examples which are offered by way of illustration. The present disclosure is not limited to the Examples given herein.

Materials

Unless stated otherwise, all reagents were obtained or are available from chemical vendors such as Sigma-Aldrich Company, St. Louis, Mo., or may be synthesized by known methods. Unless otherwise reported, all ratios are by dry weight.

Abbreviations for materials and reagents used in the examples are as follows in Table 1:

TABLE 1

Materials

| ABBREVIATION | DESCRIPTION |
|---|---|
| ACR | Trimethylolpropane triacrylate obtained under the trade designation "TMPTA" from Allnex Inc., Brussels, Belgium. |
| ALOX P180 | Aluminum oxide conforming the FEPA (Federation of the European Producers of Abrasives) standard for P grade P180, obtained under the trade designation "BFRPL" from Imerys Fused Minerals, Niagara Falls, New York |
| ALOX P240 | Aluminum oxide conforming the FEPA (Federation of the European Producers of Abrasives) standard for P grade P240, obtained under the trade designation "BFRPL" from Imerys Fused Minerals, Niagara Falls, New York |
| EP1 | Biphenol-A epoxy resin having an epoxy equivalent weight of 210-220 g/eq, obtained under the tradename of EPONEX 1510 from Momentive Specialty Chemicals, Inc., Columbus, Ohio. |
| Minex 10 | Anhydrous sodium potassium alumino silicate obtained from Unimin Corporation, New Canaan, Connecticut. |
| CPI 6976 | Mixture of 4-thiophenylphenyl diphenyl sulfonium hexafluoroantimonate, and bis[4-(diphenylsulfonio)phenyl]sulfide bis(hexafluoroantimonate) in propylene carbonate, obtained under the trade designation "CPI 6976" from Aceto Corporation, Port Washington, New York. |
| BYK-W985 | Solution of acidic polyester with sodium o-phenylphenate, obtained under the trade designation "BYK-W 985" from Altana AG, Wesel, Germany. |
| Irgacure 1173 | 2-hydroxy-2-methyl-1-phenyl-1-propan-1-one obtained under trade designation "IRGACURE 1173" from BASF Corporation. |
| PF1 | Phenol-formaldehyde resin having a phenol to formaldehyde molar ratio of 1:1.5-2.1, and catalyzed with 2.5 percent by weight potassium hydroxide. |
| EC-1197 | Liquid polyester resin commercially available under the trade name "EC-1197" from American eChem Inc., Lulfin, Texas, USA. |
| AD-33 | A wetting agent commercially available under trade designation "Interwet 33" from Ackros Chemicals America, New Brunswich, NJ, USA. |
| S9 | Purple pigment commercially available under the trade designation "9S93" from Penn Color, Doylestown, Pennsylvania. |
| UF-2026 | Urea formaldehyde resin, obtained under the trade designation "DURITE AL-3029C" (65 percent solids) from Hexion Inc., Columbus, Ohio. |
| Tergitol | Multipurpose surfactant, obtained under the trade designation "TERGITOL 15-S-7 SURFACTANT" from Dow Agrosciences LLC, Indianapolis, Indiana. |
| Devoflo 40CM X | Calcium stearate dispersion available from EChem, Leeds, UK |
| JC LMV7051 | Styrene acrylic emulsion available under the trade designation "JONCRYL LMV 7051" from BASF Corporation. |
| DOWICIL QK-20: | Broad-spectrum biocide available under the trade designation "DOWICIL Antimicrobials" from Dow Chemical Company, Midland, MI |
| HL27 | Non-silicone antifoam obtained from Harcros Chemical Inc, St Paul, Minnesota. |

TABLE 1-continued

Materials

| ABBREVIATION | DESCRIPTION |
|---|---|
| KATHON CG-ICP | Biocide available under the trade designation "KATHON CG/ICP" from Dow Chemical Company, Midland, Michigan. |
| NH$_4$Cl | Ammonium chloride 25% obtained from Zaclon LLC, Cleveland, Ohio |
| AlCl$_3$ | Aluminum chloride solution (Technical grade) obtained from GEO Specialty Chemicals, Inc., Amblar, Philadelphia. |
| ANTIFOAM 1512 | Defoaming agent obtained as "ADVANTAGE 1512" from Ashland, Covington, Kentucky |
| SAP1, SAP2, SAP3, SAP4 | Shaped abrasive particles prepared according to the description disclosed below in "Formation of Shaped Abrasive Particles." |
| AF | silicone antifoam available under the trade designation "DOW CORNING ANTIFOAM 1520 - US" from Dow Corning Corp., Midland, Michigan |
| CARBEZ3 | rheology modifier available under the trade designation "CARBOPOL EZ-3 POLYMER" from Noveon, Inc., Cleveland, Ohio |
| CARBEZ3S | 5 weight percent solution of CARBEZ3 in water |
| CUBITRON | Crush ceramic aluminum oxide, obtained under the trade designation "321 CUBITRON 120× CRUSHED GRAIN" from 3M Company, Saint Paul, Minnesota |
| FIB1 | 15 denier high tenacity nylon 6,6 crimp set fiber with a staple length of 1.5 inches (3.81 centimeters), obtained under the trade designation "NEXYLON PA 6.6 STAPLE FIBRES" from EMS-CHEMIE GmbH & Co. KG, Neumuenster, Germany |
| LCD4115 | carbon black dispersion available under the trade designation "LCD-4115 SPECIALTY CARBON BLACK DISPERSION" from Sun Chemical Corporation, Amelia, Ohio |
| LiSt | lithium stearate |
| LiStS | 44.7 weight percent solution of lithium stearate available under the trade designation "LITHIUMSOAP 1" from Baerlocher, Cincinnati, Ohio, in PMA |
| RESIN SYSTEM | Urethane resin system including fillers and lubricants |
| SiC | Silane treated 150 grit silicon carbide abrasive particles available under the trade designation "150 SIC CARBOREX C-6 SILKOTE", from Washington Mills Electro Minerals Group, Niagara Falls, New York |
| AO | ALODUR BFRPL, grade 220 from Treibacher, Villach, Austria |
| T403 | polyetheramine available under the trade designation "JEFFAMINE T-403 POLYETHERAMINE" from Huntsman International LLC, Salt Lake City, Utah |
| T403LiSt | mixture of 66.7 weight percent T$_4$0$_3$ and 33.3 weight percent LiSt |
| T403S | 25 weight percent solution of T$_4$0$_3$ in water |
| TR407 | acrylic resin, from Rohm & Haas, Philadelphia, Pennsylvania |
| RPD0210 | surfactant, Sun Chemical, Parsippany, New Jersey |
| BROWNH2O | Pigment Dispersion, from Color Corp of America, Chicago, IL |
| H$_2$O | Water from Maplewood, MN |
| W290H | aqueous polyurethane dispersion, from Lanxess Corp Pittsburgh Pennsylvania |
| GL720 | acrylic resin, from Rohm n Haas Philadelphia, Pennsylvania |
| DF880 | silicone free air release additive, from Elementis Specialties London, UK |
| Poly-G 20-265 | polyether diol, from Monument Chemical Group, Houston, Texas |
| Poly-G 76-635 | polyether triol, from Monument Chemical Group Houston, Texas |
| K1215 | methyl bis(polyethoxy ethanonol) coco ammonium chloride quaternary surfactant, from Evonik Goldschmidt Corporation Hopewell, VA |
| TXIB | trimethyl pentanyl diisobutyrate, from Eastman Chemical Kingsport, TN |
| Wollastocoat 10012-400 | calcium silicate, from Nyco America Newnan, Georgia |
| NO1283 | pigment, from Rockwood Pigments NA, Inc., Beltsville, MD |
| HY | aluminum silicate, from Southern Clay Products Inc., Gonzales, Texas |
| 120 Aluminum Oxide | crushed aluminum oxide, from Washington Mills, Niagara Falls, NY |
| DCF-AO | crushed aluminum oxide, from Washington Mills, Niagara Falls, NY Washington Mills Niagara Falls, NY |
| Mondur 257 | polymeric diisocyanate, from Bayer Leverkusen, Germany |

Formation of Shaped Abrasive Particles

Formation of SAP1

A sample of boehmite sol-gel was made using the following recipe: aluminum oxide monohydrate powder (800 parts) having the trade designation "DISPERAL" (Sasol, North America) was dispersed by high shear mixing a solution containing water (1200 parts) and 70% aqueous nitric acid (72 parts) for 11 minutes. The resulting sol-gel was aged for at least 1 hour before coating. The sol-gel was forced into production tooling having triangular shaped mold cavities of 0.1 millimeter (mm) depth and 0.30 mm on each side. The draft angle α between the sidewall and bottom of the mold was 98 degrees. The sol-gel was forced into the cavities with a putty knife so that the openings of the production tooling were completely filled. A mold release agent, 0.2% peanut oil in methanol was used to coat the production tooling using a brush to fill the open cavities in the production tooling. The excess methanol was allowed to evaporate in a hood at room temperature. The sol-gel coated production tooling was allowed to air dry at room temperature for at least 10 minutes, giving a concentration of release agent (after evaporation of the methanol) of 0.08 mg/in$^2$, and an average thickness of the coating (prior to evaporation of the methanol) of 138 microns. The precursor shaped abrasive particles were removed from the production tooling by passing it over an ultrasonic horn. The precursor shaped abrasive particles were calcined at approximately 650° C. and then saturated with a mixed nitrate solution of the following concentration (reported as oxides): 1.8% each of MgO, Y$_2$O$_3$, Nd$_2$O$_3$ and La$_2$O$_3$. The excess nitrate solution was removed and the saturated precursor shaped abrasive particles were allowed to dry after which the particles were again calcined at 650° C. and sintered at approximately 1400° C. Both the calcining and sintering was performed using rotary tube kilns. The fired shaped abrasive particles were about 0.15 millimeter (side length)×0.04 millimeter thick. The average radius of curvature of the shaped abrasive particles was determined as the average radius of curvature of the open face tips of the particles. The radius of curvature was determined as the radius of the smallest circle that, when viewed in a direction orthogonal to the open face of the shaped abrasive particle including the open face tip, passes through a point on each of the two sides of the open face of the shaped abrasive particle that come together to form the tip at the start of a curve of the tip where each of the two sides transition from straight to curved. The average of 12 radii from four particles is taken, resulting in 2.0 micron.

Formation of SAP2

The procedure generally described in "Formation of SAP1" was repeated, with the exception that the sol-gel was forced into a production tooling having tetrahedral shaped mold cavities of 0.25 mm depth and 0.30 mm on each side. The draft angle α between the sidewall and bottom of the mold was 98 degrees. The fired shaped abrasive particles were about 0.15 millimeter (side length)×0.12 millimeter thick. The average radius of curvature of the resultant shaped abrasive particles was 2.0 micron, as measured according to the radius of curvature general measurement method described in the example for the formation of SAP1.

Formation of SAP3

The procedure generally described in "Formation of SAP1" was repeated, with the exception that the sol-gel was forced into production tooling having triangular shaped mold cavities of 0.14 mm depth and 0.41 mm on each side. The draft angle α between the sidewall and bottom of the mold was 98 degrees. The fired shaped abrasive particles were about 0.20 millimeter (side length)×0.05 millimeter thick. The average radius of curvature of the resultant shaped abrasive particles was 2.0 micron, as measured according to the radius of curvature general measurement method described in the example for the formation of SAP1.

Formation of SAP4

The procedure generally described in "Formation of SAP1" was repeated, with the exception that the sol-gel was forced into production tooling having tetrahedral shaped mold cavities of 0.33 mm depth and 0.41 mm on each side. The draft angle α between the sidewall and bottom of the mold was 98 degrees. The fired shaped abrasive particles were about 0.20 millimeter (side length)×0.16 millimeter thick. The average radius of curvature of the resultant shaped abrasive particles was 2.0 micron, as measured according to the radius of curvature general measurement method described in the example for the formation of SAP1.

Example 1

Preparation of Phenolic Make Resin MR1

A 3-liter container was charged with 800 grams of PF1, 200 grams of EC-1197, 30 grams of AD-33 and 100 grams of water. The mixture was stirred with an overhead stirrer for 15 minutes at 22° C.

Preparation of Phenolic Size Resin SR1

A 237-ml container was charged with 70 grams of PF1 and 30 grams of water. The mixture was stirred with an overhead stirrer for 15 minutes at 22° C.

Figure 6:
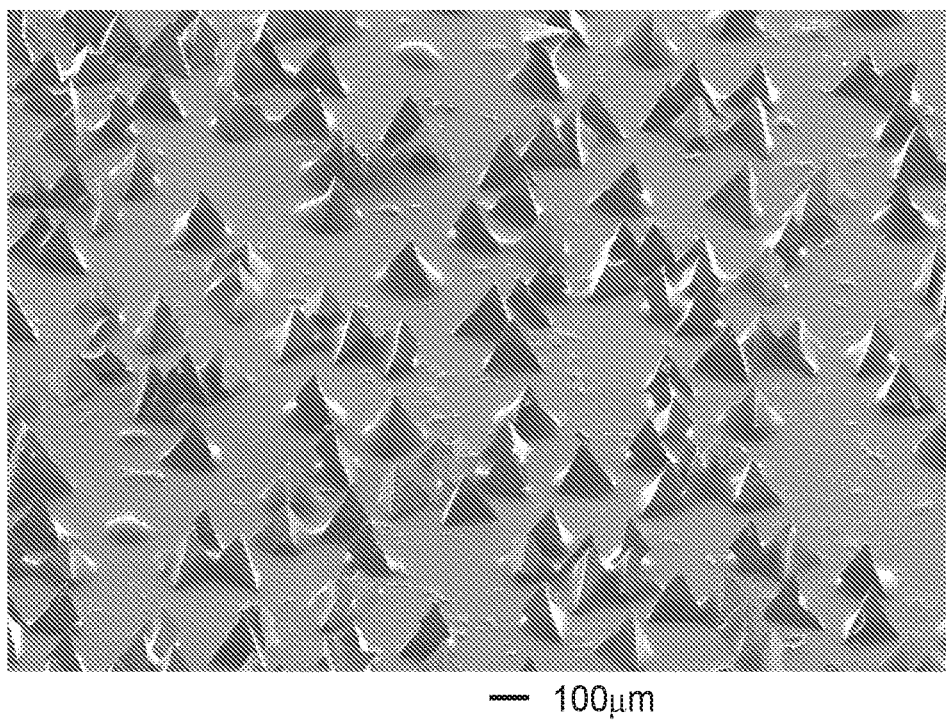
FIG. 6 is a scanning electron microscope image of a coated abrasive article according to Example 1, in accordance with various embodiments.

A 10 cm wide 5 mil polyester film was coated with make resin MR1 using a 10 cm wide coating knife set at a 0.025 mm resulting in a coating weight of about 8.7 g/m². The knife is commercially available at from GARDCO, Pompano Beach, Fla. Next, the SAP2 mineral was coated onto make resin layer using proprietary electrostatic coater. The mineral coating weight was about 38.5 g/mm². The coated abrasive was cured at 90° C. for 1.5 hours and at 102° C. for 12 hours. An SEM image of the coated abrasive particle is shown in FIG. 6.

Comparative Example A

Figure 7:
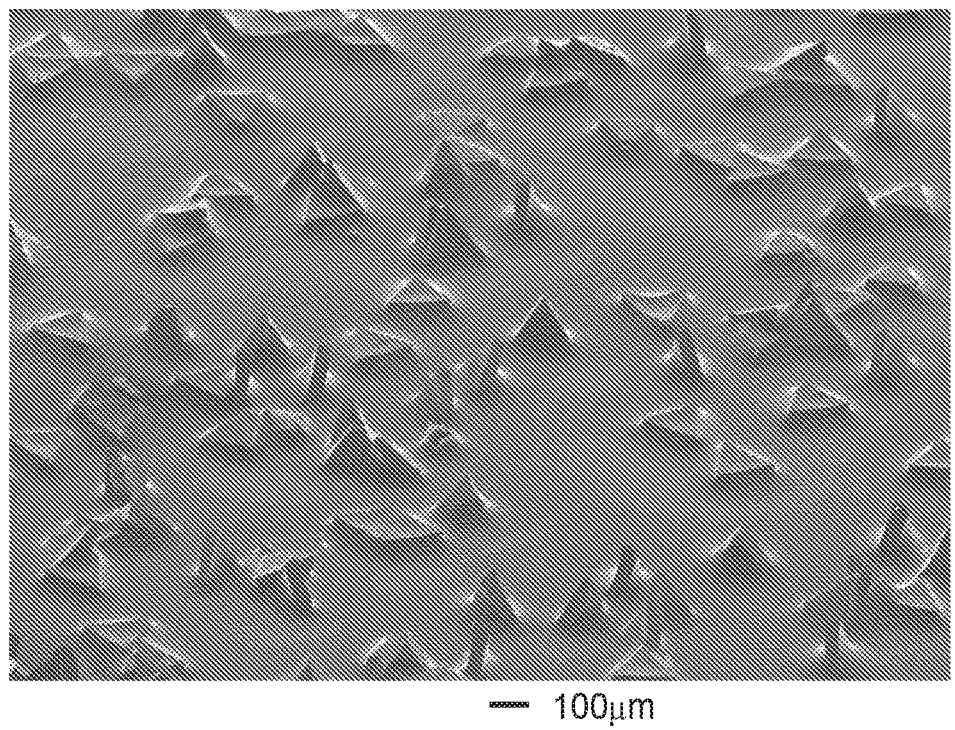
FIG. 7 is a scanning electron microscope image of a coated abrasive article according to Comparative Example A, in accordance with various embodiments.

The procedure generally described in Example 1 was repeated, with the exception that SAP1 with mineral weight of 33.5 g/m² was used instead of SAP2. An SEM image of the coated abrasive particle is shown in FIG. 7.

Example 2

A 10 cm wide 5 mil polyester film was coated with make resin MR1 using a 10 cm wide coating knife set at a 0.025 mm resulting in a coating weight of about 8.7 g/m². The knife is commercially available at from GARDCO, Pompano Beach, Fla. Next, the SAP2 mineral was coated onto make resin layer using proprietary electrostatic coater. The mineral coating weight was about 38.5 g/m². The coated abrasive was cured at 90° C. for 1.5 hours and at 102° C. for 1 hour. Size resin SR1 was coated onto make and mineral construction using a paint roller. The size resin weight was about 29 g/m². The resultant construction was cured at 90° C. for 1 hour and at 102° C. for 12 hours.

Comparative Example B

The procedure generally described in Example 1A was repeated, with the exception that SAP1 with mineral weight of 33.5 g/m² was used instead of SAP2. The size weight was about 25 g/m² instead of 29 g/m².

Particle Orientation Analysis by Scanning Electron Microscopy

Samples of the coated abrasive articles containing SAP1 and SAP2 made according to Example 1 and Comparative Example A were obtained before the application of size resin. Subsequently, each sample was mounted with carbon tape on a ⅛ mounting plug and sputter coated with gold in a Denton Vacuum Desk-5 sputter coater. The mounting plug with the coated sample was then placed inside a JEOL-JSM-7600F Field Emission Scanning Electron Microscope (SEM) chamber. Once sample was ready to be imaged, micrographs were taken at 50× magnification with a 45-degree tilt. A comparison of the images collected for samples from Example 1 and Comparative Example A is shown in FIGS. 6 and 7, respectively. Manual counting of the number of tips pointed perpendicularly outward from the backing per unit area (~5.56 mm²) was carried out and reported below as PSG particle orientation results. 157 of 162 abrasive particles (97% of the abrasive particles) were orientated tips pointed perpendicularly outward from the backing for Sample from Example 1. 48 of 114 abrasive particles (42% of the abrasive particles) were orientated tips pointed perpendicularly outward from the backing for Sample from Comparative Example A.

Performance Test A

Coated abrasive articles generated from Example 2 and Comparative Example B were tested in the following matter. The weight of a 1.6 cm wide by 5.4 cm diameter 1010 mild carbon steel ring workpiece was measured obtain initial weight. The workpiece was attached to the end of a motor driven 75 cm round shaft by a threaded bolt. Next a 1.8 cm wide by 17 cm coated abrasive test sample was threaded through attachment systems so abrasive is in contact with workpiece. The test contact area of abrasive and workpiece was about 1.8 cm×1.8 cm. The workpiece was subject to a small flow of water (0.5 ml/sec) during the test. A pressure of 3.5 kg/cm² was placed on contact area. The test involved spinning the workpiece at 100 revolutions per minutes in forward direction for 7 seconds and then in reverse direction for 7 seconds. The workpiece was removed and weighed and compared to initial weight to determine amount of metal removed. The surface roughness of workpiece was measured with profilometer and reported as RA(micrometers) and RZ (micrometers).

The performance in Table 2 indicates the advantage of open coat and channel formation of tetrahedrons.

TABLE 2

Performance Test A

| Description | RA (micrometers) | RZ (micrometers) | Cut (g) | % Cut |
|---|---|---|---|---|
| Example 2 | 0.53 | 4.8 | 0.1173 | 249 |
| Comparative Example B | 0.79 | 5.1 | 0.0471 | 100 |

Example 3

A 3-liter container was charged with 80 grams of PF1, 20 grams of EC-1197, 3 grams of AD-33 and 50 grams of water. The mixture was stirred with an overhead stirrer for 15 minutes at 22° C.

A 10 cm wide 5 mil polyester film was coated with make resin MR1 using a 10 cm wide coating knife set at a 0.025 mm resulting in a coating weight of about 9.5 g/m². The knife is commercially available at from GARDCO, Pompano Beach, Fla. Next, the SAP2 mineral was coated onto make resin layer using proprietary electrostatic coater. The mineral coating weight was about 43 g/m². The coated abrasive was cured at 90° C. for 1.5 hours and at 102° C. for 1 hour. Size resin SR1 was coated onto make and mineral construction using a paint roller. The size resin weight was about 39 g/m². The resultant construction was cured at 90° C. for 1 hour and at 102° C. for 12 hours.

Comparative Example C

The sample was a microfinishing film abrasive obtained as 372 L (60 u), commercially available from 3M, St. Paul, Minn. The microfinishing film abrasive is a micron graded aluminum oxide on a polyester film.

The performance in Table 3 indicates the advantage of open coat and channel formation of tetrahedrons.

TABLE 3

(Performance Test A)

| Description | RA (micrometers) | RZ (micrometers) | Cut (g) | % Cut |
|---|---|---|---|---|
| Example 4 (SAP-2) | 0.74 | 5.7 | 0.1758 | 173 |
| Comparative Example C (SAP-1) | 0.79 | 5.1 | 0.1014 | 100 |

Example 4

A make resin was prepared, according to the composition listed in Table 4. The premix was prepared by mixing 70% EP1 and 30% ACR. To 55.40% of premix, 0.60% BYK-W985, 40% Minex 10, 3% CPI 6976, and 1% Irgacure 1173. The formulation was stirred for 30 minutes at 24° C. until homogeneous.

TABLE 4

Make Resin Composition

| | Composition |
|---|---|
| Make Resin Premix | |
| EP1 | 70.00% |
| ACR | 30.00% |
| | 100% |
| Make Resin | |
| Premix | 55.40% |
| BYK-W985 | 0.60% |
| Minex 10 | 40.00% |
| CPI 6976 | 3.00% |
| Irgacure 819 | 1.00% |
| | 100% |

The size resin was prepared by premixing 70% EP1 and 30% ACR. To 55.06% of premium size premix, 0.59% BYK-W985, 39.95% Minex 10, 3% CPI 6976, 1% Irgacure 1173, and 0.40% S9. The formulation was stirred for 30 minutes at 24° C. until homogeneous.

The calcium stearate based supersize resin was prepared by mixing 74.7% calcium stearate dispersion (Devflo 40CM X), 12% styrene acrylic emulsion (JC LMV7051), 0.3% antifoaming agent (HL27), 0.13% of DOWICIL QK-20 and 0.07% of KATHON CG-ICP as biocides in 12.8% water using high speed mixer. The formulation was stirred at 24° C. until homogeneous.

Film backing (obtained as "SCOTCHPAK" from 3M Company, St. Paul, Minn.) was coated with 10 g/m² of an epoxy-acrylate make resin. The coating was exposed to UV fusion system with one set of D bulbs and one set of V bulbs both operating at 600 W/in (236 W/cm), converting the resin into a tacky, partially cured make coat. Abrasive particle blend containing 90% ALOX P240 and 10% SAP2 were then coated onto the make-coat at a nominal mineral coating weights 52 g/m² using an electrostatic particle coater. The web was then exposed to infrared heaters at a nominal web temperature setting of 100° C., for about 7 seconds. The size resin was then roll coated onto the make layer and abrasive particles at a nominal dry coating weights for 240+(50 g/m²) and passed under a Fusion UV System with one set of H-bulbs, and two sets of D-bulbs, all three operating at 600 W/in (236 W/cm) for 5-10 sec. It was then processed through infrared ovens having a target exit web temperature of 125° C. for 5 mins. The supersize resin was coating then applied using roll-coat technique at coating weight of 10 g/m², which goes through the drying cycle at temperature setting of 60-90° C. zones. The resultant coated abrasive articles were then maintained at 20-24° C. and 40-60 percent relative humidity until tested. After drying, the strip of coated abrasive was converted into discs as is known in the art.

Comparative Example D

The procedure generally described in Example 4 was repeated, with the exception that SAP1 was used instead of SAP2.

Performance Test B for Example 4 and Comparative Example D

A 6 inch (15.24 cm) diameter abrasive disc to be tested was mounted on an electric rotary tool that was disposed over an X-Y table having an OEM panel secured to the X-Y table. A 3M Elite DA Sander with 3/16 servo was attached to the robotic arm. The tool was then set to traverse in the Y direction along the length of the panel; along the width of the panel. Seven such passes along the length of the panel were completed in each cycle for a total of 4 cycles. The rotary tool was then activated to rotate at 6000 rpm under no load. The abrasive article was then urged at an angle of 2.5 degrees against the panel at a load of 13 lbs down force (5.90 kg). The tool was then activated to move through the prescribed path. The mass of the panel was measured before and after each 1-minute cycle to determine the total mass loss in grams after each cycle. Cut was measured in grams removed from the clear coating layer of OEM panel. Total cut was measured by adding all four cut values from four abrasion cycles reported in Table 5. The finish measured using profilometer was reported in Table 6. All reported data was based on average test results from 6 sample replicates.

TABLE 5

Cut Data

| Example | Cut at cycle 1 (g) | Cut at cycle 2 (g) | Cut at cycle 3 (g) | Cut at cycle 4 (g) | Total cut (g) | Ratio of Cut at cycle 4 to Cut at cycle 1 |
|---|---|---|---|---|---|---|
| Example 1 | 6.57 | 5.52 | 4.86 | 4.22 | 21.17 | 0.64 |
| Comparative Example A | 5.82 | 5.22 | 4.84 | 4.54 | 20.41 | 0.78 |

TABLE 6

Finish Data

| Sample | RA (micrometers) | RZ (micrometers) |
|---|---|---|
| Example 1 | 1.82 | 11.36 |
| Comparative Example A | 2.42 | 14.00 |

Example 5

Making of Coated Abrasive Article with 10% SAP 4 Blended with P180)

Preparation of Make and Size Resin

The coating solution was prepared by adding 69.70 g UF-2026, 0.07 g Tergitol, 0.15 g Antifoam 1512 and 20.0 g Minex 10 to a container and mechanically stirred for 1 h at room temperature. After mixing, 3.88 g 25% $NH_4Cl$ aqueous solution and 4.80 g 28% $AlCl_3$ aqueous solution were added to the mixture right before coating.

Film backing (obtained as "SCOTCHPAK" from 3M Company, St. Paul, Minn.) was coated with 15 g/m² of make resin. The Imerys BFRPL aluminum oxide (ALOX P180) with 10% PSG mineral particles (SAP4 and SAP3) were then coated onto the make-coat at a nominal mineral coating weights 70 g/m² using an electrostatic particle coater. The web was then exposed to 170° C. in oven for about 2 h. The size resin was then roll coated onto the make layer and abrasive particles at a nominal dry coating weights (65 g/m²) It was then processed through ovens having a target exit web temperature of 170° C. for 2 h. The resultant coated abrasive articles were then maintained at 20-24° C. and 40-60 percent relative humidity until tested. After drying, the strip of coated abrasive was converted into discs as is known in the art.

Comparative Example E

Making of Coated Abrasive Article with SAP1

The procedure generally described in Example 5 was repeated, with the exception that SAP1 was used instead of SAP2.

Performance Test C for Example 5 and Comparative Example E

The Abrasion performance tests were done using standard tests developed for 180 mineral grade on base coat/clear coat to compare total cut of different lots of 180. A 6 inch (15.24 cm) diameter abrasive disc to be tested were mounted on an electric rotary tool that was disposed over an X-Y table having an OEM panel secured to the X-Y table. A 3M Elite DA Sander with 3/16 servo was attached to the robotic arm. The tool was then set to traverse in the Y direction along the length of the panel; along the width of the panel. Seven such passes along the length of the panel were completed in each cycle for a total of 4 cycles. The rotary tool was then activated to rotate at 6700 rpm for 180 under no load. The abrasive article was then urged at an angle of 2.5 degrees against the panel at a load of 15 lbs. down force. The tool was then activated to move through the prescribed path. The mass of the panel was measured before and after each cycle to determine the total mass loss in grams after each cycle. Cut was measured in grams removed from the clear coating layer of OEM panel. Total cut was measured by adding all four cut values from four abrasion cycles reported in Table 7. The finish measured using profilometer for all samples reported were similar. The reported data came from the average of measurements from 3 discs.

TABLE 7

Cut measurements using X-Y testing

| Sample | Cut 1 min (g) | Cut 2 min (g) | Cut 3 min (g) | Cut 4 min (g) | Total cut (g) | Cut Life (Cut 4 min/Cut 1 min) |
|---|---|---|---|---|---|---|
| Example 5 | 8.66 | 6.44 | 5.66 | 5.42 | 26.19 | 0.626 |
| Comparative Example E | 11.06 | 7.57 | 6.40 | 4.89 | 29.92 | 0.442 |

Example 6

Convolute Wheel

Production of Convolute Wheels

A nonwoven web was formed on an air laid fiber web forming machine, available under the trade designation "RANDO-WEBBER" from the Rando Machine Corporation of Macedon, N.Y. The fiber web was formed from FIB1. The weight of the web was approximately 125 grams per square meter (gsm). The web was conveyed to a horizontal, two-roll coater, where a prebond resin was applied at a wet add-on weight of 50 gsm. The prebond resin had the following composition (all percentages relative to component weight): 44.4% water, 28.0% $T_4O_3S$, 18.7% EP1, 0.5% AF, 1% LCD4115, 2.9% $T_4O_3$ LiSt, 4.5% CARBEZ3S. The prebond resin was cured to a non-tacky condition by passing the coated web through a convection oven at 345° F. (174° C.) for 3 minutes, yielding a prebond, nonwoven web having a basis weight of 176 gsm.

A slurry was prepared, including tetrahedral shaped abrasive particles, with the slurry having the formula described in Table 8. The slurry was prepared in batches with a weight of about 10 kilograms using a high-shear mixer with the speed adjusted to generate a strong vortex in the slurry while mixing.

TABLE 8

Slurry formula.
Material Amounts in Grams

| | Wheel ID | |
|---|---|---|
| Raw Material | Example 1 | Comparative Sample A |
| RESIN SYSTEM | 5055 | 5055 |
| SiC | 1232 | 1232 |
| SAP2 | 3713 | |
| AO | | 3713 |

Convolute abrasive wheels were prepared from the prebonded nonwoven web as follows. A 15-inch (38-centimeter) wide by 360-inch (914-centimeter) long section was cut from the prebonded, nonwoven web and saturated with abrasive slurry. The saturated prebonded web was then passed through the nip of a roll coater, consisting of 6-inch (15-centimeter) diameter rolls, to remove excess slurry until the desired slurry add-on weight of 1373 gsm was obtained.

Typically, the web passes through the nip at 6 feet per minute (1.83 meters per minute). The coated prebonded web was placed in a forced air oven set at 215° F. (102° C.) for 2 minutes to remove a majority of the solvent. Spiral wraps of coated prebond web were wound around the fiberglass core under tension and with a pressure roll urging each wrap in position until the outer diameter of the wound nonwoven abrasive web and core, hereafter referred to as a "log", was approximately 6.625 inch (16.8 centimeter). The loose end of the nonwoven abrasive was secured to the log with a string and placed in a forced air oven set at 245° F. (118° C.) for 35 hours. After removal from the oven, the log was cooled to room temperature, and mounted on a lathe and the outer diameter of the bun reduced to approximately 6-inch (15.2 centimeter) with a diamond point tool. The log was then cut with a diamond saw perpendicular to the axis of the core to form several convolute abrasive wheels measuring approximately 6-inch (15.2 centimeter) diameter, 0.5-inch (1.27 centimeter) wide, with a 1-inch (2.54 centimeter) center hole. Material densities of the resulting abrasive articles, were between 0.022 lb/in$^3$ (0.61 grams/cm$^3$) and 0.026 lb/in$^3$ (0.67 grams/cm$^3$).

Performance Testing of Convolute Wheels

The Abrasion Test measured the abrasive efficiency of comparative test wheels and was conducted using a dual-spindle automated machine. A 6-inch (15.24-centimeter) diameter 0.5-inch (1.27-centimeter) thick test wheel mounted on one spindle and a 2.0-inch (5.08-centimeter) diameter by 0.125-inch (3.175-millimeter) thick carbon steel tube workpiece mounted on the other spindle. The workpiece was set to rotate at 32 revolutions per minute and the abrasive wheel was set to rotate at 3600 revolutions per minute. The abrasive wheel and the workpiece were urged together at a load of 8 pounds (3.63 kilograms). During the test, the end of the pre-weighed rotating tube was urged against the pre-weighed wheel at the selected test load for 15-second intervals followed by a noncontact period of 15 seconds. Each Abrasion Test ran for a total of 30 minutes with the total time the workpiece contacted the wheel being 15 minutes. Total Cut was determined by the weight loss of the workpiece and the Wheel Wear was determined by the weight loss of the abrasive wheel. Results were reported as Cut and Wear in grams for each test wheel. The grams of steel cut, and the grams of wheel worn, are illustrated in Table 9.

TABLE 9

Test results

| Wheel | Cut (gm steel) | Wear (gm Wheel) | Abrasive Particle |
|---|---|---|---|
| Example 1 | 27 | 5.8 | SAP2 |
| Sample A | 6.2 | 0.9 | AO |

Example 8

Flap Brush

A nonwoven web was formed on an air laid fiber web forming machine, available under the trade designation "RANDO-WEBBER" from the Rando Machine Corporation of Macedon, N.Y. A web made from Invista nylon staple, 40 denier 3" fiber, Type 852 was formed into a 0.5" lofty web to an approximately 270 grams per square meter (gsm). The web was conveyed and a prebond resin PB1 was sprayed applied at a dry add-on weight of 70 gsm. The prebond resin (components in Table 10) was cured by passing through a convection oven at 345° F. (174° C.) for 3 minutes, yielding a prebond of 340 gsm.

Slurries S1A and S2PSG having formula described in Tables 11 and 12 were prepared to compare the performance cutting and finishing values of regular aluminum oxide with the tetrahedron precision shaped abrasive SAP2.

The Prebond web was passed through a dual roll nip coater to achieve the desired slurry add-on weight of 1009 gsm and a total weight of 1349 gsm. The coated prebond web was conveyed through a forced air oven set at 160° C. for 2 minutes to cure dry to touch. The web was slit into 1.25" wide strips by 20" long and held in a former around a 1.25" core with epoxy adhesive to form a log. The former was placed in an oven for 45 minutes at 93.3° C. The log was removed from former and placed in oven for additional 30 minutes to "fluff" into shape.

After removal from the oven, the log was cooled to room temperature, and mounted on a lathe to true the log on center with an outer diameter of 4.5 inches. The log was then cut with a diamond saw perpendicular to the axis of the core to form several brushes 4.5 inches in diameter and 4.0 inches wide with 1.25 inch center hole. Material densities of the resulting abrasive articles, were between 0.45 grams/cm$^3$ and 0.59 grams/cm$^3$.

TABLE 10

| FORMULA PB1 | |
|---|---|
| PRODUCT NAME | QTY - wt % |
| TR407 | 25.1 |
| RPD0210 | 0.3 |
| BROWNH$_2$O | 0.2 |
| H$_2$O | 37.4 |

TABLE 10-continued

FORMULA PB1

| PRODUCT NAME | QTY - wt % |
|---|---|
| W290H | 12.3 |
| GL720 | 24.6 |
| DF880 | 0.001 |
| | 100 |

TABLE 11

FORMULA S1A

| Product Name | QTY - wt % |
|---|---|
| Ploy-G 20-265 | 9.0% |
| Poly-G 76-635 | 9.0% |
| K1215 | 0.4% |
| TXIB | 2.7% |
| Wollastocoat 10012-400 | 4.6% |
| NO1283 | 1.7% |
| HY | 0.6% |
| 120 Aluminum Oxide | 36.5% |
| DCF-AO | 15.1% |
| Mondur 257 | 20.4% |
| | 100.0% |

TABLE 12

FORMULA S2PSG

| Product Name | QTY - wt % |
|---|---|
| Ploy-G 20-265 | 9.0% |
| Poly-G 76-635 | 9.0% |
| K1215 | 0.4% |
| TXIB | 2.7% |
| Wollastocoat 10012-400 | 4.6% |
| NO1283 | 1.7% |
| HY | 0.6% |
| SAP2 | 36.5% |
| DCF-AO | 15.1% |
| Mondur 257 | 20.4% |
| | 100.0% |

Performance Testing of Flap Brushes;

An X-Y table is utilized to spin the brush and with downward pressure reciprocating over various stainless steel (SS) substrates for various dwell times. Total Cut was determined by the weight loss of the workpiece, and Attrition, or wheel wear was determined by the weight loss of the brush.

TABLE 13

Results of brushes tested for finish on stainless steel and aluminum

| Stainless Steel Plate | RA Value (micrometers) |
|---|---|
| 120 WM AO | 6 |
| SAP2 | 8 |

| Aluminum plate | RA (micrometers) | RZ (micrometers) | Gloss 20° | Gloss 60° | Gloss 85° |
|---|---|---|---|---|---|
| 120 WM AO | 0.6 | 5.7 | 29.0 | 45.2 | 28.8 |
| SAP2 | 0.7 | 5.7 | 29.4 | 44.3 | 25.0 |

TABLE 14

Results on SS perforated plate 3 # at 3000 rpms for 10 minutes; SS expanded plate (cheese grater shape) 3# at 3000 rpms for 10 minutes; and SS flat 12 # at 1750 rpms for three minutes

| PLATE TYPE | GRADE | TOTAL CUT | ATTRITION | % WEAR |
|---|---|---|---|---|
| SS Perforated | 120 AO | 7.06 | 3.52 | 1 |
| SS Perforated | SAP2 | 15.99 | 8.12 | 2.36 |
| SS Flat | 120 AO | 0.83 | 0.12 | 0.03 |
| SS Flat | SAP2 | 1.18 | 0.07 | 0.02 |
| SS Expanded | 120 AO | 3.09 | 19.04 | 5.45 |
| SS Expanded | SAP2 | 4.35 | 7.95 | 2.37 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

ADDITIONAL EMBODIMENTS

The following exemplary embodiments are provided, the numbering of which is not to be construed as designating levels of importance:

Embodiment 1 provides an abrasive article comprising:
a backing defining a major surface; and
an abrasive layer comprising a plurality of tetrahedral abrasive particles attached to the backing by a make coat;
wherein the tetrahedral abrasive particles comprise four faces joined by six edges terminating at four vertices, each one of the four faces contacting three of the four faces, and a major portion of the tetrahedral abrasive particles have at least one of the vertices oriented in substantially a same direction.

Embodiment 2 provides the abrasive article of Embodiment 1, wherein the backing is a flexible backing.

Embodiment 3 provides the abrasive article of any one of Embodiments 1 or 2, wherein the backing comprises at least one material chosen from a polymeric film, a metal foil, a woven fabric, a knitted fabric, paper, vulcanized fiber, a staple fiber, a continuous fiber, a nonwoven, a foam, a screen, and a laminate.

Embodiment 4 provides the abrasive article of any one of Embodiments 1-3, wherein the make coat comprises a resinous adhesive.

Embodiment 5 provides the abrasive article of Embodiment 4, wherein the resinous adhesive comprises one or more resins.

Embodiment 6 provides the abrasive article of Embodiment 5, wherein the one or more resins are chosen from a phenolic resin, an epoxy resin, a urea-formaldehyde resin, an acrylate resin, an aminoplast resin, a melamine resin, an acrylated epoxy resin, a urethane resin, and mixtures thereof.

Embodiment 7 provides the abrasive article of any one of Embodiments 1-6, wherein at least one of the four faces is substantially planar.

Embodiment 8 provides the abrasive article of any one of Embodiments 1-7, wherein at least one of the four faces is concave.

Embodiment 9 provides the abrasive article of any one of Embodiments 1-6, wherein all of the four faces are concave.

Embodiment 10 provides the abrasive article of any one of Embodiments 1-7, wherein at least one of the four faces is convex.

Embodiment 11 provides the abrasive article of any one of Embodiments 1-6, wherein all of the four faces are convex.

Embodiment 12 provides the abrasive article of any one of Embodiments 1-11, wherein at least one of the tetrahedral abrasive particles comprises sol-gel-derived alumina.

Embodiment 13 provides the abrasive article of any one of Embodiments 1-12, wherein at least one of the tetrahedral abrasive particles comprises alpha alumina.

Embodiment 14 provides the abrasive article of any one of Embodiments 1-13, wherein at least one of the tetrahedral abrasive particles has a coating of inorganic particles thereon.

Embodiment 15 provides the abrasive article of any one of Embodiments 1-14, wherein at least one of the tetrahedral abrasive particles has equally sized edges.

Embodiment 16 provides the abrasive article of any one of Embodiments 1-15, wherein at least one of the tetrahedral abrasive particles has different-sized edges.

Embodiment 17 provides the abrasive article of any one of Embodiments 1-16, wherein a length of the edges independently ranges from about 0.1 µm to about 2000 µm.

Embodiment 18 provides the abrasive article of any one of Embodiments 1-17, wherein a length of the edges independently ranges from about 150 µm to about 200 µm.

Embodiment 19 provides the abrasive article of any one of Embodiments 1-18, wherein the tetrahedral abrasive particles range from about 1 wt % to about 90 wt % of the abrasive layer.

Embodiment 20 provides the abrasive article of any one of Embodiments 1-19, wherein the tetrahedral abrasive particles range from about 10 wt % to about 50 wt % of the abrasive layer.

Embodiment 21 provides the abrasive article of any one of Embodiments 1-20, wherein the major portion of the tetrahedral abrasive particles ranges from about 70% to about 100% of the tetrahedral abrasive particles.

Embodiment 22 provides the abrasive article of any one of Embodiments 1-21, wherein the major portion of the tetrahedral abrasive particles ranges from about 90% to about 100% of the tetrahedral abrasive particles.

Embodiment 23 provides the abrasive article of any one of Embodiments 1-22, wherein the tetrahedral abrasive particles of the major portion have a vertex oriented away from the backing along a z-direction.

Embodiment 24 provides the abrasive article of any one of Embodiments 1-23, wherein each of the tetrahedral abrasive particles of the major portion has a face in contact with the backing.

Embodiment 25 provides the abrasive article of any one of Embodiments 1-24, wherein at least one of the vertices of at least one of the tetrahedral abrasive particles has at least one surface feature chosen from a concave surface, a convex surface, a point, an aperture, a ridge, a line, a protrusion, and a depression.

Embodiment 26 provides the abrasive article of any one of Embodiments 1-25, wherein at least a portion of the tetrahedral abrasive particles have three of the vertices oriented in substantially a same direction.

Embodiment 27 provides the abrasive article of Embodiment 26, wherein the portion of the tetrahedral abrasive particles having three of the vertices oriented in substantially the same direction ranges from about 1% to about 100% of the tetrahedral abrasive particles.

Embodiment 28 provides the abrasive article of any one of Embodiments 1-27, wherein a radius of curvature of the vertices independently ranges from about 0.5 µm to about 80 µm.

Embodiment 29 provides the abrasive article of any one of Embodiments 1-28, wherein the tetrahedral abrasive particles are distributed over about 10% to about 95% of a surface area of a first side of the backing.

Embodiment 30 provides the abrasive article of any one of Embodiments 1-29, wherein the tetrahedral abrasive particles are distributed over about 10% to about 50% of a surface area of a first side of the backing.

Embodiment 31 provides the abrasive article of any one of Embodiments 1-30, wherein the tetrahedral abrasive particles are randomly distributed on the backing.

Embodiment 32 provides the abrasive article of any one of Embodiments 1-31, wherein the tetrahedral abrasive particles are distributed according to a predetermined pattern on the backing.

Embodiment 33 provides the abrasive article of any one of Embodiments 1-32, wherein the abrasive layer further comprises a plurality of crushed abrasive particles.

Embodiment 34 provides the abrasive article of Embodiment 33, wherein the crushed abrasive particles range from about 5 wt % to about 96 wt % of the abrasive layer.

Embodiment 35 provides the abrasive article of Embodiment 33, wherein the crushed abrasive particles range from about 15 wt % to about 50 wt % of the abrasive layer.

Embodiment 36 provides the abrasive article of any one of Embodiments 1-35, wherein the abrasive layer further comprises a plurality of secondary formed abrasive particles.

Embodiment 37 provides the abrasive article of Embodiment 36, wherein the secondary formed abrasive particles have a non-tetrahedral shape.

Embodiment 38 provides the abrasive article of any one of Embodiments 36 or 37, wherein the plurality of secondary formed abrasive particles ranges from about 5 wt % to about 95 wt % of the abrasive layer.

Embodiment 39 provides the abrasive article of any one of Embodiments 1-38, wherein the abrasive article is a grinding wheel or a portion thereof.

Embodiment 40 provides the abrasive article of Embodiment 39, wherein the grinding wheel is a depressed-center grinding wheel or a portion thereof.

Embodiment 41 provides the abrasive article of any one of Embodiments 1-38, wherein the abrasive article is a cut-off wheel or a portion thereof.

Embodiment 42 provides the abrasive article of any one of Embodiments 1-38, wherein the abrasive article is a belt or a portion thereof.

Embodiment 43 provides the abrasive article of any one of Embodiments 1-42, wherein the base is a nonwoven web comprising a plurality of fibers, filaments, or combinations thereof.

Embodiment 44 provides the abrasive article of Embodiment 43, wherein the plurality of fibers comprise a vulcanized fiber, a staple fiber, a continuous fiber, or a combination thereof.

Embodiment 45 provides the abrasive article of any one of Embodiments 43 or 44, wherein the abrasive articles is a flap brush, the flap brush comprising:
a core including an outer surface;
a plurality of flaps adhered to the outer surface of the core, each flap comprising the nonwoven web.

Embodiment 46 provides the abrasive article of any one of Embodiments 43 or 44, wherein the abrasive article is a convolute abrasive wheel comprising:
a core including an outer surface; and
the nonwoven web spirally wound about and affixed to the outer surface of the core.

Embodiment 47 provides an abrasive article comprising:
a backing defining a surface along major surface; and
an abrasive layer comprising a plurality of tetrahedral abrasive particles attached to the backing by a binder comprising a resinous adhesive;
wherein the tetrahedral abrasive particles have four faces joined by six edges terminating at four vertices, each one of the four faces contacting three of the four faces, and about 90% to about 100% of the tetrahedral abrasive particles have one of the vertices oriented away from the backing along a direction perpendicular to the major surface at a point of contact therebetween.

Embodiment 48 provides a method of forming the abrasive article of any one of Embodiments 1-47, comprising:
disposing the plurality of tetrahedral abrasive particles on the backing; and
adhering the plurality of tetrahedral abrasive particles on the backing to form the abrasive article.

Embodiment 49 provides the method of Embodiment 48, wherein disposing the plurality of tetrahedral abrasive particles comprises drop-coating the particles.

Embodiment 50 provides the method of Embodiment 48, wherein disposing the plurality of tetrahedral abrasive particles comprises electrostatic-coating the particles.

Embodiment 51 provides the method of any one of Embodiments 48-50, wherein disposing the plurality of tetrahedral abrasive particles comprises passing the plurality of tetrahedral abrasive particles through a screen.

Embodiment 52 provides a method of abrading a workpiece, the method comprising:
frictionally contacting at least a portion of the abrasive article as in any one of Embodiments 1-47, or formed according to the method of any one of Embodiments 48-51, with a surface of the workpiece; and
moving at least one of the workpiece or the abrasive article to abrade at least a portion of the surface of the workpiece.

What is claimed is:

1. An abrasive article comprising:
a backing defining a major surface; and
an abrasive layer comprising a plurality of tetrahedral abrasive particles attached to the backing;
wherein the tetrahedral abrasive particles comprise four faces joined by six edges terminating at four vertices, each one of the four faces contacting three of the four faces, and a major portion of the tetrahedral abrasive particles have at least one of the vertices oriented in substantially a same direction; and
wherein a length of the edges independently ranges from about 150 μm to about 200 μm and wherein an average radius of curvature of a vertex of each of the plurality of tetrahedral particles independently ranges from about 0.5 μm to about 50 μm.

2. The abrasive article of claim 1, wherein the backing comprises at least one material chosen from a polymeric film, a metal foil, a woven fabric, a knitted fabric, paper, vulcanized fiber, a staple fiber, a continuous fiber, a nonwoven, a foam, a screen, a laminate, or combinations thereof.

3. The abrasive article of claim 1, wherein at least one of the four faces is substantially planar.

4. The abrasive article of claim 1, wherein at least one of the tetrahedral abrasive particles comprises sol-gel-derived alumina.

5. The abrasive article of claim 1, wherein at least one of the tetrahedral abrasive particles comprises alpha alumina.

6. The abrasive article of claim 1, wherein at least one of the tetrahedral abrasive particles has equally sized edges.

7. The abrasive article of claim 1, wherein the major portion of the tetrahedral abrasive particles ranges from about 70% to about 100% of the tetrahedral abrasive particles.

8. The abrasive article of claim 1, wherein the tetrahedral abrasive particles of the major portion have a vertex oriented away from the backing along a direction substantially perpendicular to the major surface at a point of contact therebetween.

9. The abrasive article of claim 1, wherein at least a portion of the tetrahedral abrasive particles have three of the vertices oriented in substantially a same direction.

10. The abrasive article of claim 1, wherein a radius of curvature of the vertices independently ranges from about 0.5 μm to about 80 μm.

11. The abrasive article of claim 1, wherein the backing comprises a nonwoven.

12. The abrasive article of claim 1, wherein the abrasive article is an abrasive disc.

13. The abrasive article of claim 1, wherein the abrasive article is a belt or a portion thereof.

14. The abrasive article of claim 1, wherein the backing is a nonwoven web comprising a plurality of fibers, filaments, or combinations thereof.

15. The abrasive article of claim 14, wherein the abrasive articles is a flap brush, the flap brush comprising:
a core including an outer surface;
a plurality of flaps adhered to the outer surface of the core, each flap comprising the nonwoven web.

16. The abrasive article of claim 14, wherein the abrasive article is a convolute abrasive wheel comprising:
a core including an outer surface; and
the nonwoven web spirally wound about and affixed to the outer surface of the core.

17. A method of forming an abrasive article, comprising:
disposing a plurality of tetrahedral abrasive particles on the backing, wherein an average length of an edge of each of the plurality of tetrahedral particles is between about 150 μm and 180 μm, and wherein an average radius of curvature of a vertex of each of the plurality of tetrahedral particles independently ranges from about 0.5 μm to about 80 μm; and
adhering the plurality of tetrahedral abrasive particles on the backing to form the abrasive article.

18. The method of claim 17, wherein disposing the plurality of tetrahedral abrasive particles comprises drop-coating the particles or electrostatic-coating the particles.

19. The method of claim 17, wherein disposing the plurality of tetrahedral abrasive particles comprises passing the plurality of tetrahedral abrasive particles through a screen.

* * * * *